United States Patent
Nonomura et al.

[19]
[11] Patent Number: 6,158,280
[45] Date of Patent: Dec. 12, 2000

[54] DETECTOR FOR DETECTING ANGULAR VELOCITIES ABOUT PERPENDICULAR AXES

[75] Inventors: Yutaka Nonomura; Motohiro Fujiyoshi; Yoshiteru Omura; Norio Fujitsuka, all of Aichi, Japan

[73] Assignee: Kabushiki Kaisha Toyota Chuo Kenkyusho, Aichi-gun, Japan

[21] Appl. No.: 09/218,151

[22] Filed: Dec. 22, 1998

[30] Foreign Application Priority Data

Dec. 22, 1997 [JP] Japan ................................. 9-365724

[51] Int. Cl.$^7$ ...................................................... G01P 9/04
[52] U.S. Cl. ................................... 73/504.04; 73/504.15; 73/514.02; 73/514.32
[58] Field of Search ........................... 73/504.04, 504.12, 73/504.14, 504.15, 504.16, 514.02, 514.32

[56] References Cited

U.S. PATENT DOCUMENTS 5,894,091  4/1999  Kubota .................... 73/504.12
5,952,572  9/1999  Yamashita et al. ........... 73/504.04

FOREIGN PATENT DOCUMENTS 2-218914  8/1990  Japan .
9-196682  7/1997  Japan .

*Primary Examiner*—John E. Chapman
*Attorney, Agent, or Firm*—Oblon, Spivak, McClelland, Maier & Neustadt, P.C.

[57] ABSTRACT

A detector has first and second excitation beams extending along X-axis and Y-axis directions. These beams are fixed to a substrate via an intersecting portion. Mass portions are disposed at free ends of the beams. Sensing electrodes are disposed at the central portions of the mass portions to face the mass portions. By electrostatic force generated between the excitation electrodes and the mass portions, two mass portions vibrate in the Y-axis direction, while the remaining two mass portions vibrate in the X-axis direction. When an angular velocity $\Omega_x$ acts about the X axis, Z-axis Coriolis forces $F_{1a}$ and $F_{1b}$ act on the mass portions that are vibrating in the Y-axis direction. When an angular velocity $\Omega_y$ acts about the Y axis, Z-axis Coriolis forces $F_{2a}$ and $F_{2b}$ act on the mass portions that are vibrating in the X-axis direction. These vibrations are detected by the sensing electrodes in order to detect the angular velocities $\Omega_x$ and $\Omega_y$.

22 Claims, 15 Drawing Sheets

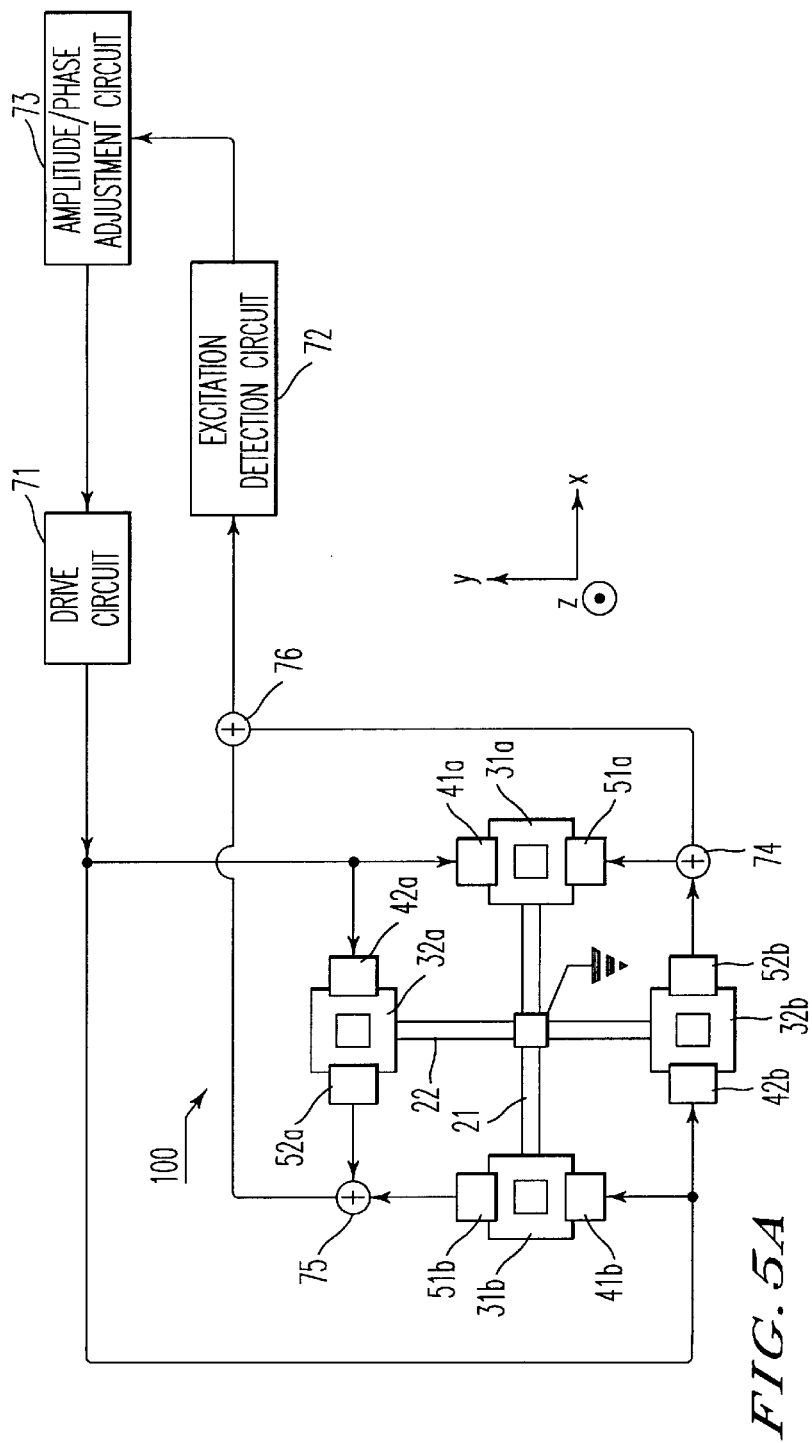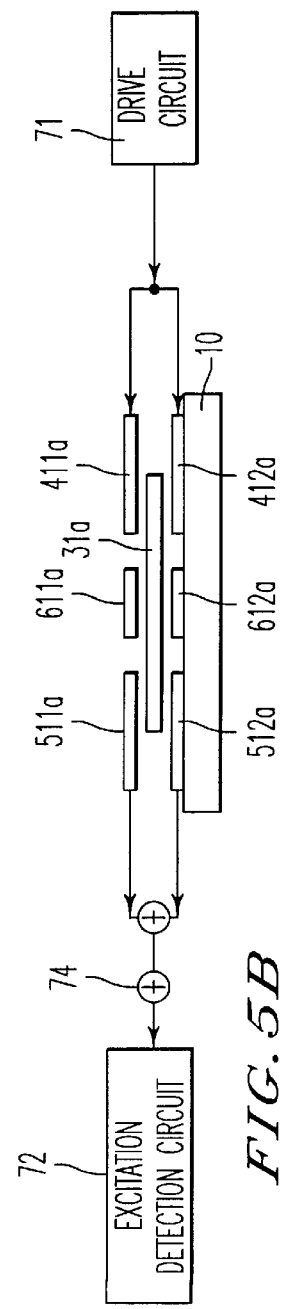
FIG. 5A
FIG. 5B

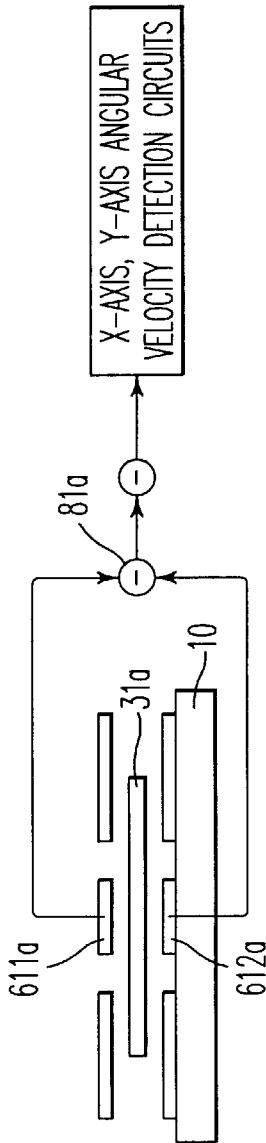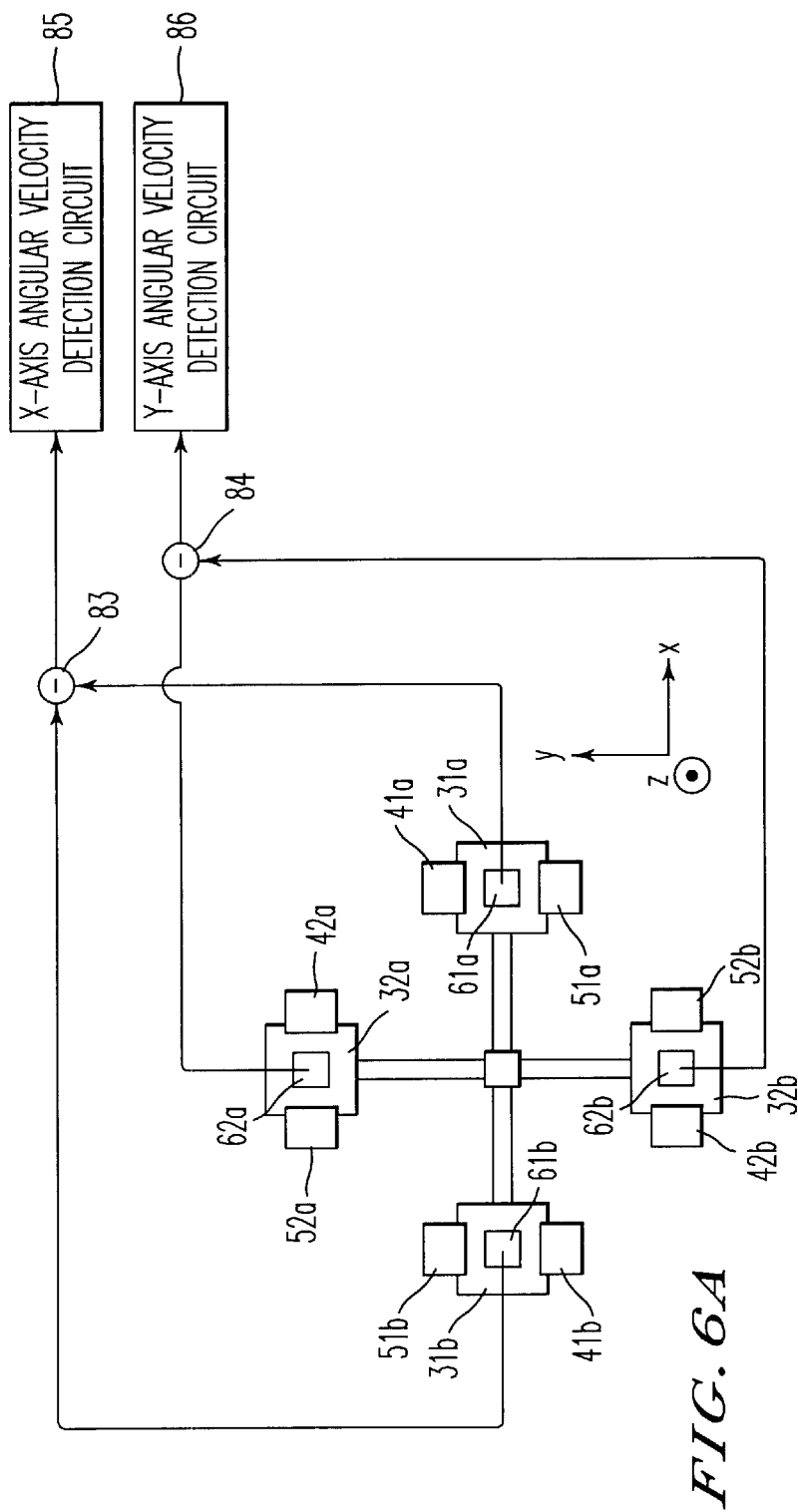
FIG. 6A
FIG. 6B

DETECTOR FOR DETECTING ANGULAR VELOCITIES ABOUT PERPENDICULAR AXES

BACKGROUND OF THE INVENTION

1. Field of the Invention

The present invention relates to a detector in which mass portions formed from a semiconductor through micro-machining and each having an inertial mass are excited in order to detect at least one physical quantity from among angular velocity, linear acceleration, and angular acceleration. More particularly, the present invention relates to a detector that has a detection axis perpendicular to a surface of a substrate and is effective in detection of angular velocity about an axis perpendicular to the detection axis and an excitation axis.

2. Description of the Related Art:

Japanese Patent Application Laid-Open (kokai) No. 2-218914 discloses a conventional angular velocity detector utilizing a Coriolis force. The angular velocity detector has a cruciform vibrator that has two X-axis vibration beams each extending along an +X axis and −X axis, respectively, and two Y-axis vibration beams each extending along a +Y axis and −Y axis, respectively. Through use of piezoelectric elements, the two X-axis vibration beams are vibrated in a positive direction along a Z axis perpendicular to a plane formed by the X-axis and Y-axis vibration beams, while the two Y-axis vibration beams are vibrated in a negative direction along the Z axis. Thus, angular velocity about the X axis is detected based on Y-axis reverse-phase vibration of the two X-axis vibration beams, and angular velocity about the Y axis is detected based on X-axis reverse-phase vibration of the two Y-axis vibration beams.

In the conventional angular velocity detector, since the vibration beams are excited along the Z axis perpendicular to the plane of the cruciform vibrator, vibration tends to leak from a supporting point at the center of the vibrator, resulting in a difficulty in obtaining stable vibration. Further, since the conventional angular velocity detector utilizes tuning fork vibrators and piezoelectric elements, the size of the detector cannot be decreased. Moreover, since wiring is required for supply of electricity to the piezoelectric elements, the state of vibration becomes unstable due to the wiring.

SUMMARY OF THE INVENTION

A first object of the present invention is to obtain a stable excitation state to hereby increase the accuracy in detecting angular velocity and acceleration.

Another object of the present invention is to allow a single detector to detect both angular velocity and acceleration.

Still another object of the present invention is to enable a single detector to simultaneously detect angular velocities about two axes, linear accelerations in three directions, and angular acceleration about a single axis.

A further object of the present invention is to reduce a size of a detector and to facilitate fabrication of the detector.

To achieve the above objects, the present invention provides a detector detecting at least one physical quantity from among linear acceleration, angular acceleration, and angular velocity, fabricated through micro-machining. In the detector, excitation beams extending along the two different directions parallel to the surface of the substrate are fixed to the substrate at their intersecting portion. The mass portions are supported at free ends of the excitation beams to be excited with respect to the substrate. The mass portions are excited such that two adjacent mass portions vibrate parallel to the substrate and in opposite phases in a rotational direction about a vertical axis to the surface of the substrate.

In the detector, a physical quantity in relation to a Coriolis force generated in a direction parallel to the vertical axis at each mass portion is detected in the form of an electrical quantity by a sensing electrode disposed to face the mass portion. Based on the thus-detected physical quantity, there can be detected angular velocity about an axis of an arbitrary direction parallel to the surface of the substrate.

The above-described excitation beams can be fabricated as follows. When X and Y axes are defined on the surface of the substrate and a Z axis is defined to be perpendicular to the surface of the substrate, the excitation beams form a cruciform shape which has beam portions extending along the X-axis and Y-axis directions and whose center intersecting portion is fixed to the surface of the substrate. The mass portions are formed at the free ends of the beam portions, and the excitation electrodes are disposed to face the mass portions in order to vibrate each mass portions in a direction perpendicular to the axis of the corresponding beam portion and the Z axis. At this time, two adjacent mass portions vibrate in opposite phases in a rotational direction about the Z axis.

The present invention also provides a detector in which a plurality of mass portions fabricated through micro-machining and each having an inertial mass are extending along two different directions parallel to a surface of a substrate in order to detect angular velocity about an axis perpendicular to the direction of the excitation and the vertical axis of the surface of the substrate. The detector comprises a substrate four mass portions, excitation beams, excitation electrodes, excitation detection electrodes, and sensing electrodes. The mass portions each have an arcuate shape to together form a ring-like shape. The excitation beams have beam portions extending along two different directions parallel to the surface of the substrate, and its center intersecting portion is fixed to the substrate. The mass portions are supported at free ends of the beam portions to be vibrated with respect to the substrate. Each of the excitation electrodes is commonly disposed between two adjacent mass portions to be located therebetween. The two excitation electrodes are disposed at radially opposite positions with respect to the vertical axis in order to vibrate the mass portion in a rotational direction about the vertical direction. Each of the excitation detection electrodes are commonly provided for two adjacent mass portions which are located therebetween. Two excitation detection electrodes are disposed at radically opposite position with respect to the vertical axis between the two excitation electrodes in order to detect vibration of the mass portions. The sensing electrodes are disposed to face the mass portions so as to detect a physical quantity in relation to a Corioli's force generated in a direction parallel to the vertical axis at each mass portion. The mass portions are excited such that two adjacent mass portions vibrate in opposite phases about the vertical axis.

In addition to the excitation beams, each mass portion may be supported at its free end by a spring, folded beam, or the like such that the spring, folded beam, or the like does not act as a resister to vibration of the mass portion in a predetermined direction. That is, each mass portion may be supported by only the excitation beams in a cantilever fashion, or may be supported at both its ends. The beam portions of the excitation beams are not required to intersect perpendicularly insofar as they extend along two different directions.

In order to detect angular velocity about the X and Y axes, sensing electrodes are provided to face the mass portions. Vibration of each mass portion in the Z-axis direction caused by a Coriolis force generated in the Z-axis direction is detected by the corresponding sensing electrode in the form of an electrical quantity such as an electrical capacitance between the sensing electrode and the mass portion, or electromotive force generated through electromagnetic induction.

The fabrication of the detector becomes simple in the case where the mass portions of the detector are formed in a ring-like shape, adjacent excitation electrodes are replaced with a common excitation electrode, and adjacent excitation detection electrodes are replaced with a common excitation detection electrode.

Two adjacent mass portions are excited such that they vibrate in a rotational direction about the Z-axis in opposite phases. Therefore, two mass portions supported by the beam portion extending along the X-axis direction vibrate in a common phase. Similarly, two mass portions supported by the beam portion extending along the Y-axis direction vibrate in a common phase. When a nonzero angular velocity is generated about the X or Y axis in such an excited state, a Corioli's force in the Z-axis direction is generated at each mass portion. A physical quantity in relation to the Corioli's force is detected by the corresponding sensing electrode— which is disposed to face the mass portion in the Z-axis direction—in the form of an electrical quantity such as an electrical capacitance between the sensing electrode and the mass portion, or electromotive force generated through electromagnetic induction. Based on the thus-detected physical quantity, the angular velocity can be detected. Angular velocity about an axis of an arbitrary direction parallel to the surface of the substrate can be detected through synthesis of two angular velocity components about the X and Y axes.

Further, acceleration in the X-axis direction is detected through measurement of an offset amount of vibration that acts in opposite phases on a pair of mass portions that are supported on the beam portion extending along the Y-axis direction and are excited in a common phase. Similarly, acceleration in the Y-axis direction is detected through measurement of an offset amount of vibration that acts in opposite phases on a pair of mass portions that are supported on the beam portion extending along the X-axis direction and are excited in a common phase.

Also, acceleration in the Z-axis direction can be detected through measurement of an amount by which all the mass portions are offset in the same phase in the Z-axis direction. That is, for angular velocity about the X or Y axis, Z-axis vibrations of a pair of mass portions supported by the excitation beams are opposite in phase. By contrast, for acceleration in the Z-axis direction, the mass portions move in the same phase. Therefore, the angular velocity can be detected separately from the acceleration in the Z-axis direction. In the present invention, since accelerations in the X, Y, and Z axes can be detected, acceleration in an arbitrary direction (vector quantity) can be obtained through detection of acceleration components in these axial directions.

Moreover, angular acceleration about the Z axis can be detected through measurement of an offset amount of vibration that acts in the same phase on the mass portions. As described above, the offset of vibration acts, in opposite phases or in the same phase, on the pair of mass portions supported by the beam portion extending along one axis, depending on whether acceleration is applied in the X-axis or Y-axis direction, or angular acceleration is applied about the Z axis. Therefore, when signals that are obtained in proportion to displacements of these two mass portions are subjected to subtraction and addition to obtain two kinds of signals, the linear acceleration and the angular acceleration can be simultaneously measured based on the two kinds of signals. In this way, the detector of the present invention can simultaneously detect linear acceleration in an arbitrary direction and angular acceleration about an axis perpendicular to the surface of the substrate, as well as angular velocity about an axis of an arbitrary direction parallel to the surface of the substrate.

As described above, in the detector of the present invention, since two adjacent mass portions are vibrated in opposite phases on a plane formed by the beam portions intersecting each other, the center of gravity does not move, so that stable vibration can be obtained. Even if the center of gravity slightly moves due to asymmetry of vibration, the movement occurs on the plane formed by the beam portions, so that effect of the movement of the center of gravity on the vibration mode is small, and therefor stable vibration is obtained. Further, excitation of the mass portions is provided by means of electrostatic force generated by the excitation electrodes disposed to face the mass portions, and detection of vibration is performed based on an electrical quantity such as an electrical capacitance between the sensing electrode and the mass portion, or electromotive force generated through electromagnetic induction. Therefore, the excitation and detection do not affect vibration of the mass portion to be detected, so that the detection accuracy is improved. Moreover, since the excitation beam, the mass portions, and the like can be obtained through micro-machining, the size of the detector can be decreased, and vibration can be controlled accurately to improve the detection accuracy.

BRIEF DESCRIPTION OF THE DRAWINGS

FIGS. 5A and 5B are block diagrams showing the configuration of a circuit for exciting mass portions of the angular velocity detector according to the first embodiment;

FIGS. 6A and 6B are block diagrams showing the configuration of a circuit for detecting angular velocities about the X and Y axes through use of the angular velocity detector according to the first embodiment;

DETAILED DESCRIPTION OF THE PREFERRED EMBODIMENTS

Embodiments of the present invention will next be described in detail with reference to the drawings.

Figure 1:
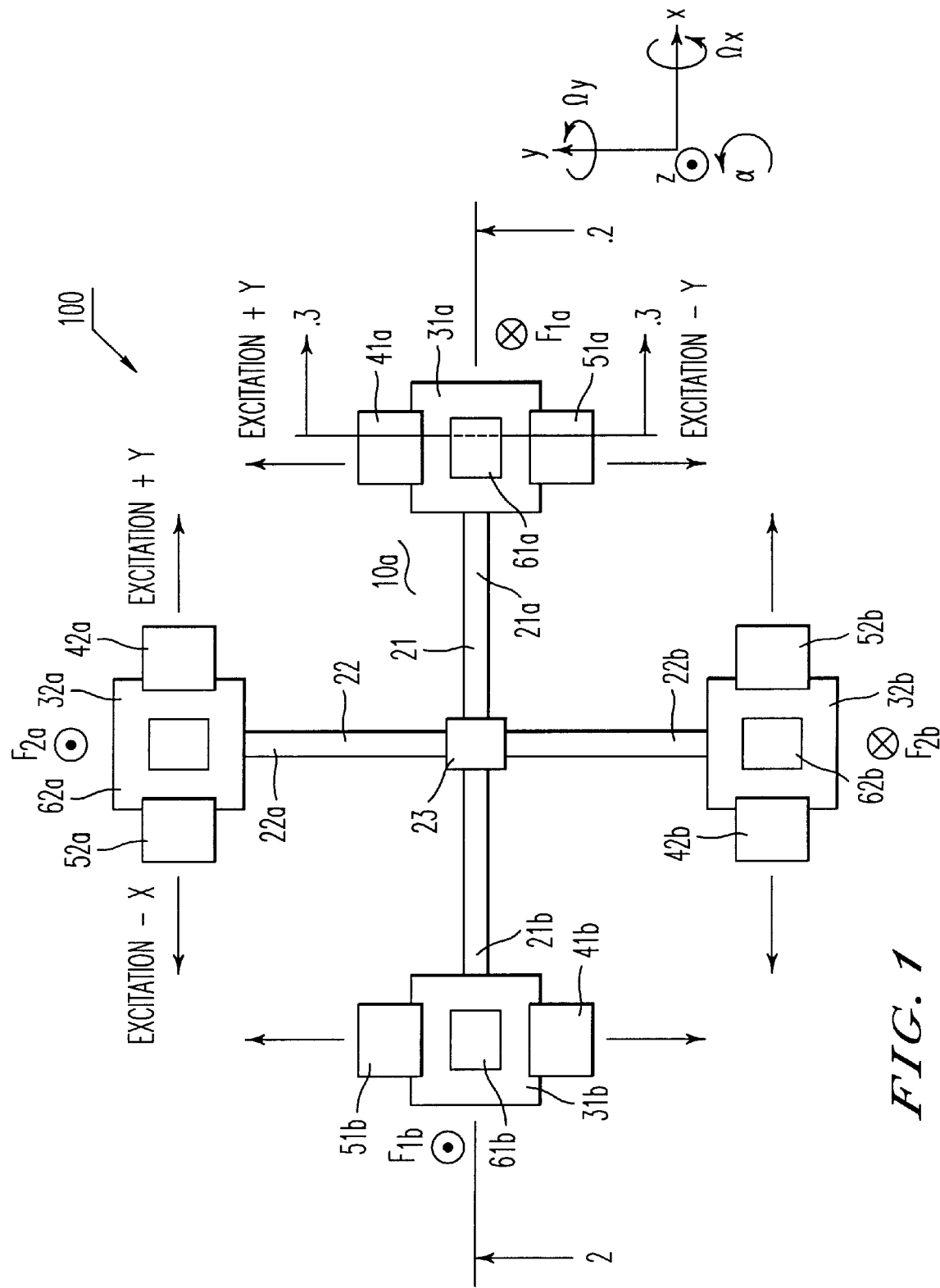
FIG. 1 is a plan view of an angular velocity detector according to a first embodiment of the present invention.
Figure 2:
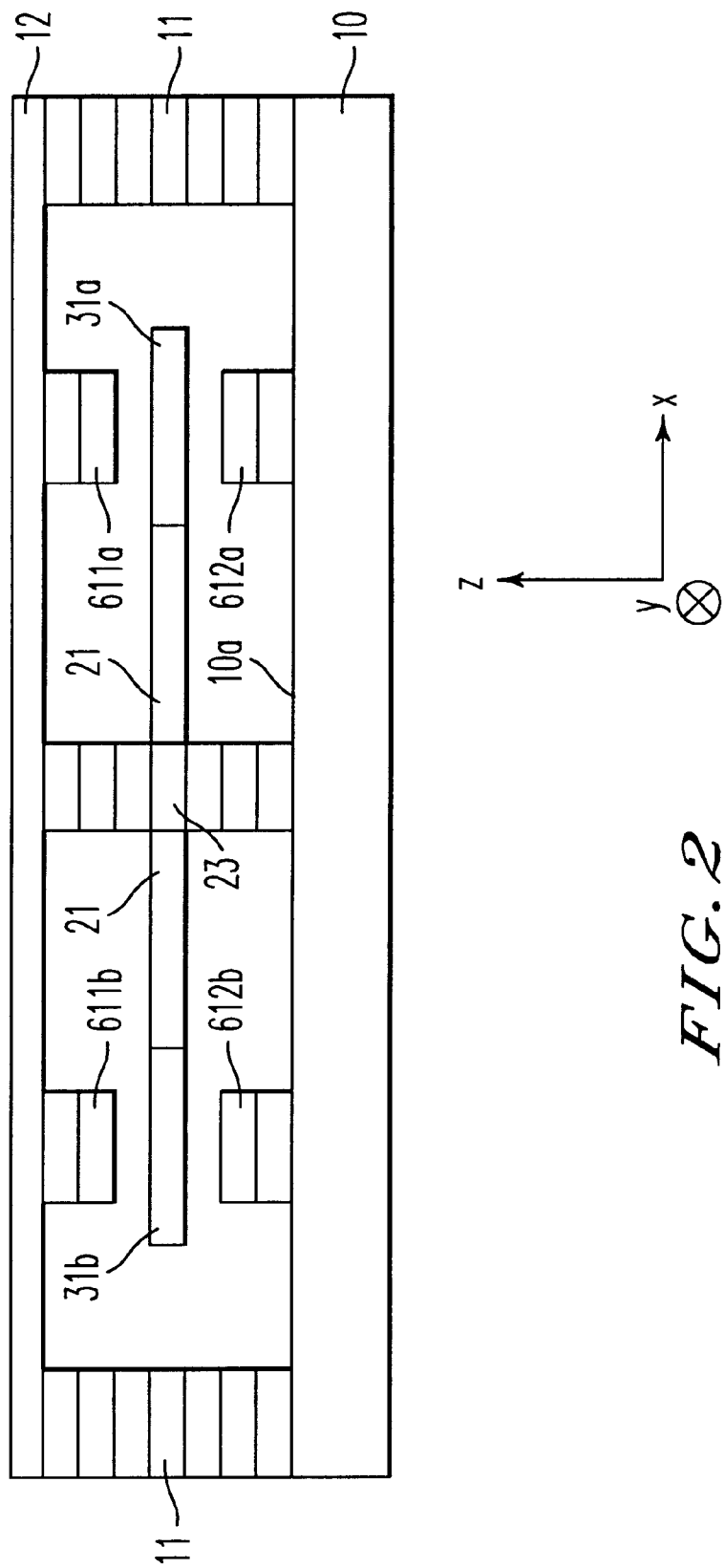
FIG. 2 is a cross-sectional view of the angular velocity detector according to the first embodiment.
Figure 3:
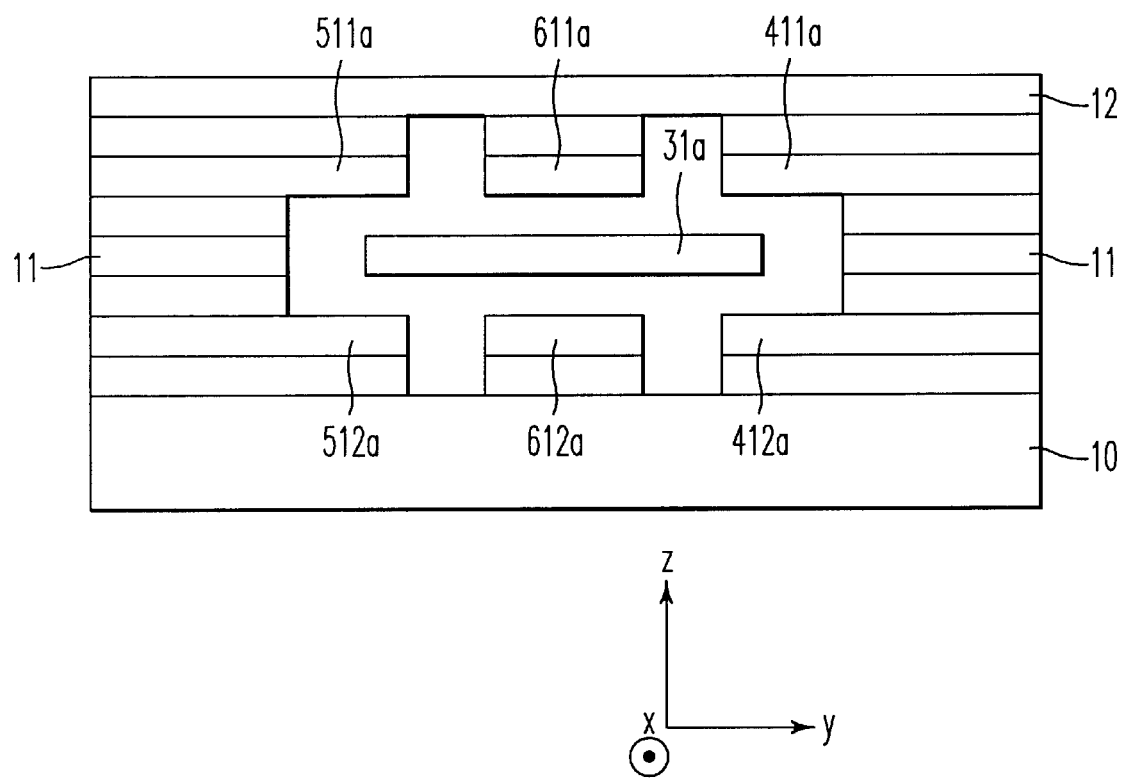
FIG. 3 is another cross-sectional view of a mass portion of the angular velocity detector according to the first embodiment.

First Embodiment:

FIG. 1 is a plan view of an angular velocity detector 100 according to a first embodiment of the present invention;

FIG. 2 is a cross-sectional view of the angular velocity detector taken along an X-axis direction, that is, line II—II; and FIG. 3 is a cross-sectional view of a mass portion of the angular velocity detector taken along a Y-axis direction, that is, line III—III. In FIG. 1, the paper surface represents a surface 10a of a substrate 10. A Z axis is defined to be perpendicular to the surface of the substrate 10a, while X and Y axes are defined on the surface 10a of the substrate 10 in a manner as shown in FIG. 1. The detector 100 can detect an angular velocity Ω about an axis of an arbitrary direction parallel to the surface 10a of the substrate 10. That is, the detector 100 can detect an angular velocity component $\Omega_x$ about the X axis and an angular velocity component $\Omega_y$ about the Y axis of the angular velocity Ω.

A first excitation beam 21 extending along the X-axis direction and a second excitation beam 22 extending along the Y-axis direction are disposed to be excited with respect to the substrate 10. The intersecting portion 23 between the first and second beams 21 and 22 is fixed to the substrate 10. A mass portion 31a having an inertial mass is provided at one end 21a of the first excitation beam 21 located on the positive X side, while a mass portion 31b having an inertial mass is provided at the other end 21b of the first excitation beam 21 located on the negative X side. Further, a mass portion 32a having an inertial mass is provided at one end 22a of the second excitation beam 22 located on the positive Y side, while a mass portion 32b having an inertial mass is provided at the other end 22b of the second excitation beam 22 located on the negative Y side.

An angular coordinate axis α is defined on the Z-axis such that the counterclockwise direction is the positive direction. For the opposed mass portions 31a and 31b, excitation electrodes 41a and 41b are respectively disposed on the positive α side with respect to the mass portions 31a and 31b. For the opposed mass portions 32a and 32b, excitation electrodes 42a and 42b are respectively disposed on the negative α side with respect to the mass portions 32a and 32b. Further, for the opposed mass portions 31a and 31b, excitation detection electrodes 51a and 51b are respectively disposed on the negative α side with respect to the mass portions 31a and 31b. For the opposed mass portions 32a and 32b, excitation detection electrodes 52a and 52b are respectively disposed on the positive α side with respect to the mass portions 32a and 32b. As is understood from FIG. 3, the excitation electrode 41a is composed of two opposed electrodes: an upper excitation electrode 411a disposed parallel to the surface 10a of the substrate 10 and a lower excitation electrode 412a disposed on the surface 10a of the substrate 10. A peripheral portion of the mass portion 31a is located between the electrodes 411a and 412a. Similarly, the excitation detection electrode 51a is composed of two opposed electrodes: an upper excitation detection electrode 511a disposed parallel to the surface 10a of the substrate 10 and a lower excitation detection electrode 512a disposed on the surface 10a of the substrate 10. A peripheral portion of the mass portion 31a is located between the electrodes 511a and 512a. Similarly, each of other excitation electrodes 41b, 42a, and 42b is composed of upper and lower excitation electrodes which are parallel to the surface 10a of the substrate 10 and are opposed to each other, while each of other excitation detection electrodes 51b, 52a, and 52b is composed of upper and lower excitation detection electrodes which are parallel to the surface 10a of the substrate 10 and are opposed to each other.

Further, sensing electrodes 61a, 61b, 62a, and 62b are respectively disposed at the central portions of the mass portions 31a, 32a, 31b, and 32b. As shown in FIG. 2, the sensing electrode 61a is composed of two opposed electrodes: an upper sensing electrode 611a disposed parallel to the surface 10a of the substrate 10 and a lower sensing electrode 612a disposed on the surface 10a of the substrate 10. The mass portion 31a is located between these electrodes 611a and 612a. Similarly, the sensing electrode 61b is composed of two opposed electrodes: an upper sensing electrode 611b disposed parallel to the surface 10a of the substrate 10 and a lower sensing electrode 612b disposed on the surface 10a of the substrate 10. The mass portion 31b is located between the electrodes 611b and 612b. Similarly, each of other sensing electrodes 62a and 62b is composed of upper and lower parallel sensing electrodes which are disposed on opposite sides of the corresponding mass portions 31b and 32b.

The upper excitation electrodes 411a, etc., the upper excitation detection electrodes 511a, etc., and the upper sensing electrodes 611a, 611b, etc. are fixed on the substrate 10 via a frame 11 layered on the substrate 10. A clearance is formed between the substrate 10 and the first excitation beam 21, the second excitation beam 22, and the mass portions 31a, 31b, 32a, and 32b. Through the support structure formed by these beams, the mass portions 31a, 31b, 32a, and 32b are supported on the substrate 10 in a floating state, so that the mass portions 31a and 31b easily displace in the Y-axis and Z-axis directions, and the mass portions 32a and 32b easily displace in the X-axis and Z-axis directions. Since each mass portion is formed continuous with the first excitation beam 21 or the second excitation beam 22, the resonant frequency can be easily adjusted through a change in the size of the mass portion.

Figure 4A:
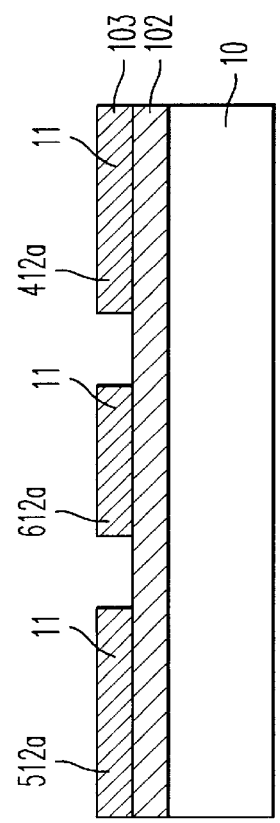
FIGS. 4A–4D are sectional views showing a process for fabricating the angular velocity detector according to the first embodiment.
Figure 4B:
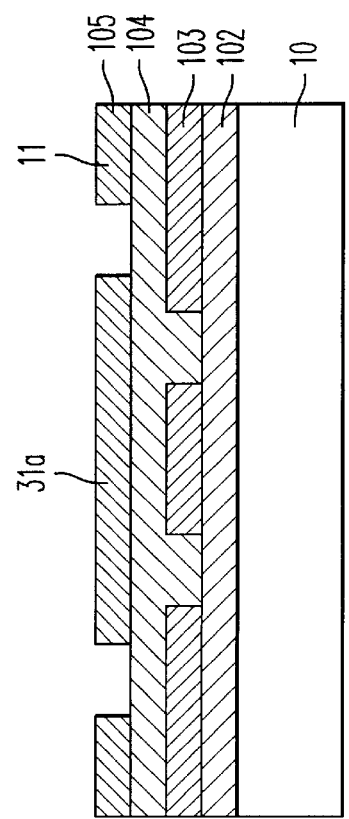

The angular velocity detector 100 having the above-described structure is fabricated from a semiconductor through use of a well-known micro-machining technique. Specifically, a silicon oxide film 102 is formed on a silicon substrate 10, and a silicon layer 103 to which an impurity is added in order to provide conductivity is formed on the silicon oxide film 102. Subsequently, photoresist is applied onto the silicon layer 103 and is patterned into a predetermined shape. Subsequently, while the photoresist pattern is used as a mask, the silicon layer 103 is etched into a predetermined shape in order to form lower excitation electrodes 412a, etc., lower excitation detection electrodes 512a, etc., lower sensing electrodes 612a, etc. and a frame 11, as shown in FIG. 4A. Next, a silicon oxide film 104 and a silicon layer 105 are successively superposed, and through lithography, the silicon layer 105 is etched into a desired shape in order to form mass portions 31a, etc., a first excitation beam 21, and a second excitation beam 22 (neither is shown in FIG. 3), as shown in FIG. 4B.

Figure 4C:
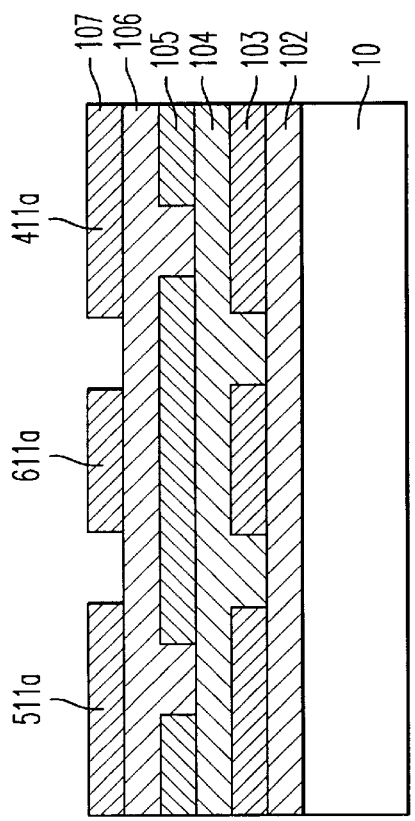
Figure 4D:
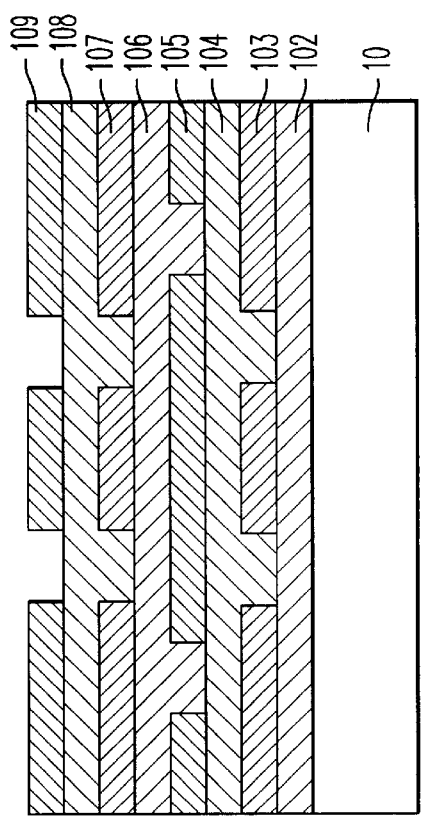

Subsequently, a silicon oxide film 106 and a silicon layer 107 are successively superposed, and through lithography, the silicon layer 107 is patterned in order to form upper excitation electrodes 411a, etc., upper excitation detection electrodes 511a, etc., and upper sensing electrodes 611a, etc., as shown in FIG. 4C. Next, as shown in FIG. 4D, a silicon oxide film 108 is formed, and a photoresist pattern 109 is formed in accordance with the shapes of the upper excitation electrodes 411a, etc., the upper excitation detection electrodes 511a, etc., the upper sensing electrodes 611a, etc., and the frame 11. In this state, the entire substrate 10 is immersed into fluoric acid solution, so that the silicon oxide films 108, 106, 104, and 102 in contact with the fluoric acid solution are successively removed.

Through such a sacrificial-layer etching technique, the mass portions 31a, 31b, 32a, and 32b, the first excitation beam 21, and the second excitation beam 22 are machined to be supported on the substrate 10 in a floating state.

In order to facilitate the penetration of the fluoric acid solution, each of the mass portions 31a, 31b, 32a, and 32b having a large area is formed into a grid-like shape (not shown) having many windows. Since each of the mass portions 31a, 31b, 32a, and 32b must have a predetermined inertial mass, the total area of the openings cannot be increased very much. Therefore, the length of each side of each window is determined to be roughly equal to the thickness of the silicon film 105 of the mass portions 31a, 31b, 32a, and 32b.

Subsequently, as shown in FIGS. 2 and 3, a cover substrate 12 is joined to the top surface of the frame 11 of the substrate 10 through anode coupling, so that the internal space defined by the substrate 10 and the cover substrate 12 is a vacuum. The lower excitation electrodes 412a, etc., the upper excitation electrodes 411a, etc., the upper excitation detection electrodes 511a, etc., the lower excitation detection electrodes 512a, etc., the upper sensing electrodes 611a, etc., and the lower sensing electrodes 612a, etc. are led to the outside of the frame 11 along the substrate 10. Respective unillustrated electrical wiring layers are connected to the external ends of the respective electrodes. The wiring layers may be formed through diffusion of impurities or deposition of a metal such as Al. The mass portions 31a, 31b, 32a, and 32b, the first excitation beam 21, and the second excitation beam 22 are designed to have ground potential.

No limitation is imposed on the material of the substrate 10. In addition to silicon, other semiconductor materials, ceramic, glass, or the like may be used. In addition to silicon oxide film, silicon nitride film, alumina, or the like may be used. Further, functional layers such as the mass portions, the first excitation beam, the second excitation beam, the excitation electrodes, the excitation detection electrodes, or the sensing electrodes may be formed of any material having elasticity. Examples of such elastic material include monocrystalline silicon, polycrystalline silicon, and metal such as nickel. When silicon is used, it is desired that silicon have a high electrical conductivity, because layers of silicon constitute the electrodes. Therefore, donor and acceptor impurities are desirably added to silicon.

Next, there will be given a description of the operation of the angular velocity detector of the present embodiment.

FIGS. 5A and 5B show a drive/detection circuit for the angular velocity detector 100. AC voltage from a drive circuit 71 is applied to the excitation electrodes 41a, 42a, 41b, and 42b. This same AC voltage is applied to the upper and lower electrodes 411a and 412a of the excitation electrodes 41a. The AC voltage is applied to other excitation electrodes in the same manner. Due to electrostatic forces acting between the excitation electrodes 41a, 41b, 42a, and 42b and the mass portions 31a, 31b, 32a, and 32b, the mass portions 31a and 31b vibrate in the Y-axis direction, while the mass portions 32a and 32b vibrate in the X-axis direction. These vibrations are detected by the excitation detection electrodes 51a, 51b, 52a, and 52b. Since the upper excitation detection electrode 511a and the lower excitation detection electrode 512a output signals of the same phase in response to the vibration, signals output from the electrodes 511a and 512a are added to obtain an output signal of the excitation detection electrode 51a. Similar actions are carried out in other excitation detection electrodes. For a displacement of the mass portion 31a in the Z-axis direction, the upper excitation detection electrode 511a and the lower excitation detection electrode 512a output signals whose phases are opposite. Therefore, the output signal of the excitation detection electrode 51a—which is the sum of the signals output from these electrodes 511a and 512a—contains no Z-axis displacement component. The signals output from the excitation detection electrodes 51a and 52b are added together by an adder 74, while the signals output from the excitation detection electrodes 52a and 51b are added together by an adder 75. Further, the signals output from the adders 74 and 75 are added together by an adder 76 and fed to an excitation detection circuit 72. Based on the output of the excitation detection circuit 72, an amplitude/phase adjustment circuit 73 adjusts the amplitude and phase of the excitation signal. The thus-adjusted excitation signals are fed to a drive circuit 71. This feedback loop allows the respective mass portions to resonate at a natural resonance frequency as described below.

Since the common AC voltage is applied to all the excitation electrodes, and the excitation electrodes and the mass portions are disposed to have a relationship shown in FIGS. 5A and 5B, the mass portions 31a and 32a vibrate in opposite phases with respect to the a axis but in the same phase with respect to the excitation detection electrodes 51a and 52a. Similarly, the mass portions 31b and 32b vibrate in opposite phases with respect to the α axis but in the same phase with respect to the excitation detection electrodes 51b and 52b. Accordingly, all the excitation detection electrodes 52a, 51b, 51a, and 52b output detection signals in the same phase, so that the signal fed to the excitation detection circuit 72 represents an average of vibrations of the mass portions 31a, 32a, 31b, and 32b. Based on the thus-detected average vibration, the amplitude and phase of the excitation signal output from the drive circuit 71 are determined such that the vibration is amplified by the amplitude/phase adjustment circuit 73.

Due to the above-described excitation, the mass portion 31a vibrates in the Y-axis direction. The displacement y of this vibration can be expressed by $y = y_0 \sin \beta t$, where $\beta$ is the angular frequency of the vibration. At this time, the displacement y of vibration of the mass portion 31b can be expressed by $y = -y_0 \sin \beta t$. Similarly, the mass portion 32a vibrates in the X-axis direction, and the displacement x of this vibration can be expressed by $x = x_0 \sin \beta t$. Also, the displacement x of vibration of the mass portion 32b can be expressed by $x = -x_0 \sin \beta t$. $x_0$ is the amplitude of the X-axis vibration, while $y_0$ is the amplitude of the Y-axis vibration.

The vibration velocities of the mass portions 31a, 31b, 32a, and 32b at this time are respectively expressed as follows:

$V_y = y_0 \beta \cos \beta t$, $V_y = -y_0 \beta \cos \beta t$, $V_x = x_0 \beta \cos \beta t$, and $V_x = -x_0 \beta \cos \beta t.$ Since the first excitation beam 21 and the second excitation beam 22 are formed in the same shape, $x_0$ is equal to $y_0$.

In this excited state, when an angular velocity $\Omega_x$ about the X-axis is generated, Coriolis forces $F_{1a}$ and $F_{1b}$ act on the mass portions 31a and 31b in the Z-axis direction, and when an angular velocity $\Omega_y$ about the Y-axis is generated, Coriolis forces $F_{2a}$ and $F_{2b}$ act on the mass portions 32a and 32b in the Z-axis direction. These Coriolis forces can be expressed as the Z-axis component of the inner product of vectors as follows:

$$F_{1a} = 2m\Omega_x V_y = -2m\Omega_x y_0 \beta \cos \beta t \quad (1)$$

$$F_{1b} = 2m\Omega_x V_y = 2m\Omega_x y_0 \beta \cos \beta t \quad (2)$$

$$F_{2a} = 2m\Omega_y V_x = 2m\Omega_y x_0 \beta \cos \beta t \quad (3)$$

$$F_{2b} = 2m\Omega_y V_x = -2m\Omega_y x_0 \beta \cos \beta t \quad (4)$$

where m is the mass of the mass portions 31a, 31b, 32a, and 32b. Due to the Coriolis forces in the Z-axis direction, the respective mass portions vibrate in the Z-axis direction at a frequency equal to the excitation frequency $\beta$, and the vibrations of the respective mass portions have amplitudes proportional to the angular velocities $\Omega_x$ and $\Omega_y$. A Z-axis displacement z of the mass portion 31a can be detected based on a change in the electric capacitance between the sensing electrode 61a and the mass portion 31a, while a Z-axis displacement z of the mass portion 31b can be detected based on a change in the electric capacitance between the sensing electrode 61b and the mass portion 31b. Similarly, a Z-axis displacement z of the mass portion 32a can be detected based on a change in the electric capacitance between the sensing electrode 62a and the mass portion 32a, while a Z-axis displacement z of the mass portion 32b can be detected based on a change in the electric capacitance between the sensing electrode 62b and the mass portion 32b. Further, the angular velocity $\Omega_x$ about the X-axis can be detected through detection of the Z-axis amplitudes of the mass portions 31a and 31b, while the angular velocity $\Omega_y$ about the Y-axis can be detected through detection of the Z-axis amplitudes of the mass portions 32a and 32b. Thus, there can be detected an angular velocity $\Omega$ about an arbitrary axis perpendicular to the Z-axis, through detection of the angular velocity $\Omega_x$ about the X-axis and the angular velocity $\Omega_y$ about the Y-axis as the components of the angular velocity $\Omega$.

A circuit shown in FIGS. 6A and 6B is provided in order to detect the angular velocities $\Omega_x$ and $\Omega_y$. In response to a displacement of the mass portion 31a in the Z-axis direction, the upper and lower sensing electrodes 611a and 612a output signals of opposite phases. Therefore, a subtracter 81a calculates a difference between these signals through subtraction in order to obtain the Z-axis displacement of the mass portion 31a. In the following description, the output signal of the subtracter 81a is called a detection signal of the sensing electrode 61a. A subtracter identical to the subtracter 81a is provided for each of the sensing electrodes 61a, 61b, 62a, and 62b.

When a nonzero angular velocity $\Omega_x$ about the X-axis is generated, as is understood from Expressions (1) and (2), the mass portions 31a and 31b vibrate in opposite phases with respect to the Z axis. Thus, the output signals of the sensing electrodes 61a and 61b have opposite phases. Therefore, a subtracter 83 calculates the difference between the output signals of the sensing electrodes 61a and 61b in order to obtain the average value of the vibrations of the mass portions 31a and 31b. Based on the magnitude of the thus-obtained average vibration, an X-axis angular-velocity detection circuit 85 senses the angular velocity $\Omega_x$ about the X axis.

Similarly, when a nonzero angular velocity $\Omega_y$ about the Y-axis is generated, as is understood from Expressions (3) and (4), the mass portions 32a and 32b vibrate in opposite phases with respect to the Z axis. Thus, the output signals of the sensing electrodes 62a and 62b have opposite phases. Therefore, a subtracter 84 calculates the difference between the output signals of the sensing electrodes 62a and 62b in order to obtain the average value of the vibrations of the mass portions 32a and 32b. Based on the magnitude of the thus-obtained average vibration, a Y-axis angular-velocity detection circuit 86 senses the angular velocity $\Omega_y$ about the Y axis.

Figure 7A:
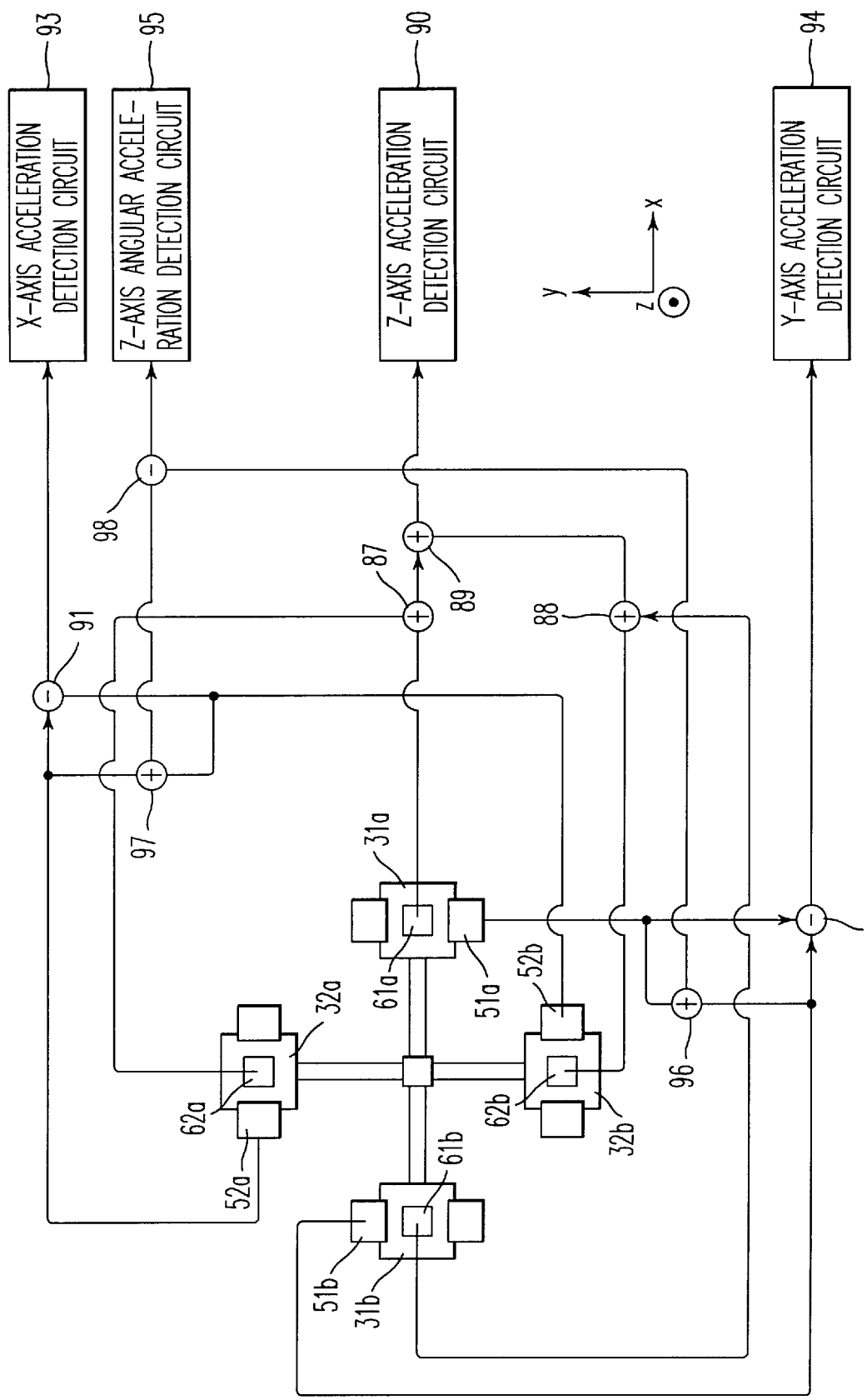
FIGS. 7A and 7B are block diagrams showing the configuration of a circuit for detecting accelerations along the X, Y, and Z directions as well as angular acceleration about the Z axis through use of the angular velocity detector according to the first embodiment.
Figure 7B:
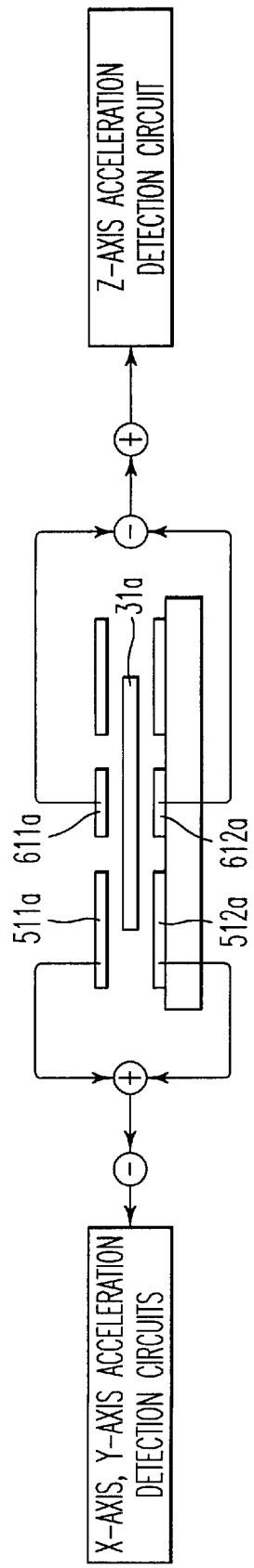

Further, through use of the detector 100, accelerations in the X-axis, Y-axis, and Z-axis directions can be detected by an apparatus shown in FIGS. 7A and 7B. As is understood from Expressions (1)–(4) in relation to the above-described angular velocity detection, the sum of the detection signals from the sensing electrodes 61a, 61b, 62a, and 62b becomes zero. When a nonzero acceleration is generated in the Z-axis direction, the four mass portions 31a, 31b, 32a, and 32b displace in the same phase in the direction of the acceleration. The amount of the displacement can be detected from the sum of the detection signals from the sensing electrodes 61a, 61b, 62a, and 62b. The sum of the detection signals is obtained through use of adders 87, 88, and 89. Based on the sum, a Z-axis acceleration detection circuit 90 senses the acceleration in the Z axis.

Further, when excitation vibration for angular velocity detection is applied to the mass portions 31a, 31b, 32a, and 32b, the excitation detection electrodes 51a and 51b output signals of a common phase, while the excitation detection electrodes 52a and 52b output signals of a common phase. Therefore, the difference between these signals is zero. Further, as described above, the upper and lower excitation detection electrodes of each excitation detection electrode output signals of opposite phases in response to a Z-axis displacement of the corresponding mass portion. Therefore, the output signal of each excitation detection electrode—which is the sum of the output signals of the upper and lower excitation detection electrodes thereof—contains no component corresponding to the Z-axis displacement. Therefore, the excitation detection electrodes output no angular velocity component.

When a nonzero acceleration is generated in the X-axis direction, the mass portions 32a and 32b displace in the same direction with respect to the X axis. In response to this displacement, the excitation detection electrodes 52a and 52b output signals of opposite phases. Therefore, a subtracter 91 subtracts the output signal of the excitation detection electrode 52b from the output signal of the excitation detection electrode 52a in order to sense the displacement in the X-axis direction. Based on the detected displacement, an X-axis acceleration detection circuit 93 senses the X-axis acceleration.

Acceleration in the Y-axis direction is detected in the same manner. When a nonzero acceleration is generated in the Y-axis direction, the mass portions 31a and 31b displace in the same direction with respect to the Y axis. In response to this displacement, the excitation detection electrodes 51a and 51b output signals of opposite phases. Therefore, a subtracter 92 subtracts the output signal of the excitation detection electrode 51b from the output signal of the excitation detection electrode 51a in order to sense the displacement in the Y-axis direction. Based on the detected displacement, a Y-axis acceleration detection circuit 94 senses the Y-axis acceleration.

Further, angular acceleration about the Z-axis can be detected as follows. All the excitation detection electrodes 51a, 51b, 52b, and 52b conceivably output the same signal in response to vibration. Therefore, a signal stemming from the vibration is not contained in a difference signal output from a subtracter 98, which calculates the difference between the addition signal from an adder 96 for adding the detection signals from the excitation detection electrodes 51a and 51b and the addition signal from an adder 97 for adding the detection signals from the excitation detection electrodes 52a and 52b. Further, the excitation detection electrodes 52a and 52b output detection signals of opposite phases in response to an acceleration in the X-axis direction, and the excitation detection electrodes 51a and 51b output detection signals of opposite phases in response to an acceleration in the Y-axis direction. Therefore, the output signals of the adders 97 and 96 do not contain signals stemming from accelerations in the X-axis and Y-axis directions. Accordingly, the output of the subtracter 98 contain no signal stemming from the acceleration acting in the X-axis or Y-axis direction. Meanwhile, when an angular acceleration is generated in the positive a direction about the Z axis, a first group of excitation detection electrodes 52a and 52b output detection signals of a common phase, and a second group of excitation detection electrodes 51a and 51b output detection signals of a common phase, such that the phase of the detection signals of the first group is opposite the phase of the detection signals of the second group. Therefore, the output signal of the subtracter 98 contains a detection signal representing the angular acceleration about the Z-axis. In this way, the angular acceleration about the Z axis is sensed by a Z-axis angular-acceleration sensing circuit 95.

In the above-described detector 100, since the first and second excitation beams 21 and 22 vibrate within a plane formed by these beams, the first and second excitation beams 21 and 22 vibrate in a well-balanced manner, so that a high Q-value of vibration is obtained, and thus a high sensitivity is obtained. Further, since the first and second excitation beams 21 and 22 are fixed at the central intersecting portion 23, the detector has an excellent temperature characteristic. Further, since the shape of the mass portions can be easily adjusted, vibration can be stabilized, while the sensitivity and temperature characteristic are improved. Further, since the substrate 10 is grounded together with the first and second excitation beams 21 and 22, the detector has excellent noise resistance.

In the above-described embodiment, the Z-axis displacement z is detected based on changes in the electric capacitances between the sensing electrodes 61a, 61b, 62a, and 62b and the mass portions 31a, 31b, 32a, and 32b. However, the following structure may be employed. A Z-axis excitation electrode, which is composed of upper and lower electrodes as in the sensing electrodes 61a, 61b, 62a, and 62b, is provided for each of the mass portions 31a, 31b, 32a, and 32b. A Z-axis displacement z is detected from the output values of the sensing electrodes 61a, 61b, 62a, and 62b, and an AC voltage is applied to the Z-axis excitation electrode such that the detected displacement z becomes zero. Based on the amplitude of the applied voltage, the angular velocities $\Omega_x$ and $\Omega_y$ are detected. When a velocity $\Omega$ is detected in a state in which the displacement in the Z-axis direction becomes zero, a nonlinear error can be eliminated, so that the detection accuracy can be further improved.

Also, the drive circuit 71, the excitation detection circuit 72, the amplitude/phase adjustment circuit 73, the X-axis angular-velocity detection circuit 85, the Y-axis angular-velocity detection circuit 86, the X-axis, Y-axis, and Z-axis acceleration detection circuits 93, 94, and 90, the Z-axis angular-acceleration detection circuit 95, and the like may be formed on the substrate 10 together with the angular velocity detector 100.

Figure 8A:
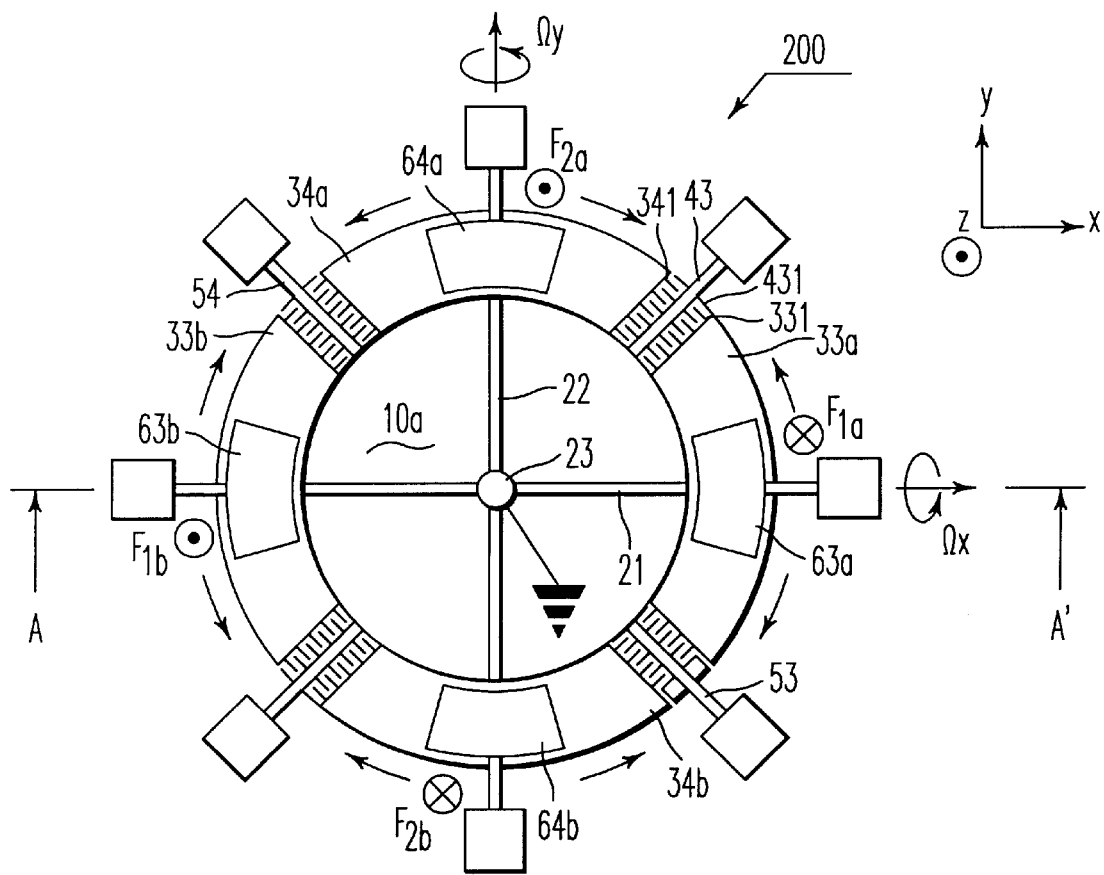
FIG. 8A is a plan view of an angular velocity detector according to a second embodiment of the present invention.
Figure 8B:
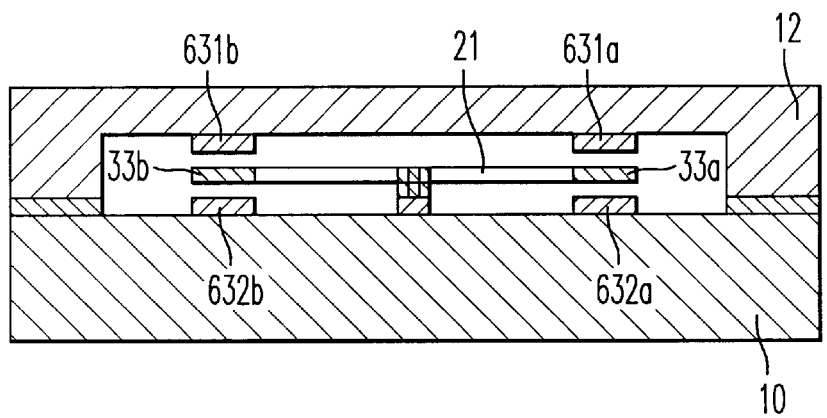
FIG. 8B is a cross-sectional view taken along line A–A' in FIG. 8A.

Second Embodiment:

Next, a description will be given of an angular velocity detector 200 according to the second embodiment of the present invention. FIGS. 8A and 8B show the structure of the angular velocity detector 200. As in the first embodiment, the paper surface represents a surface 10a of a substrate 10. A first excitation beam 21, a second excitation beam 22, and an intersecting portion 23 are formed in a manner similar to that used in the first embodiment. The present embodiment differs from the first embodiment in that mass portions 33a, 33b, 34a, and 34b respectively have an arcuate shape and are combined to form a ring-like shape; and that an excitation electrode 43 is commonly provided for the mass portions 33a and 34a, an excitation electrode 44 is commonly provided for the mass portions 33b and 34b, an excitation detection electrode 53 is commonly provided for the mass portions 33a and 34b, and an excitation detection electrode 54 is commonly provided for the mass portions 34a and 33b. The two excitation electrodes and the two excitation detection electrodes are formed in the same configuration. For example, the excitation electrode 43 is composed of a comb-shaped electrode 431 fixed to a frame 11, a comb-shaped electrode 331 formed at the end of the mass portion 33a, and a comb-shaped electrode 341 formed at the end of the mass portion 34a. These comb-shaped electrodes are in meshing engagement with one another with small clearances formed therebetween, so that the respective mass portions are vibrated in the same mode as in the first embodiment by means of electrostatic forces generated between them. The comb-shaped electrodes in meshing engagement can be moved relative to each other in the Z-axis direction. Further, sensing electrodes 63a, 63b, 64a, and 64b are disposed to face the respective mass portions 33a, 33b, 34a, and 34b. As in the first embodiment, each sensing electrode is composed of a pair of electrodes that are located on the upper and lower sides of the corresponding mass portion face to each other.

Figure 9:
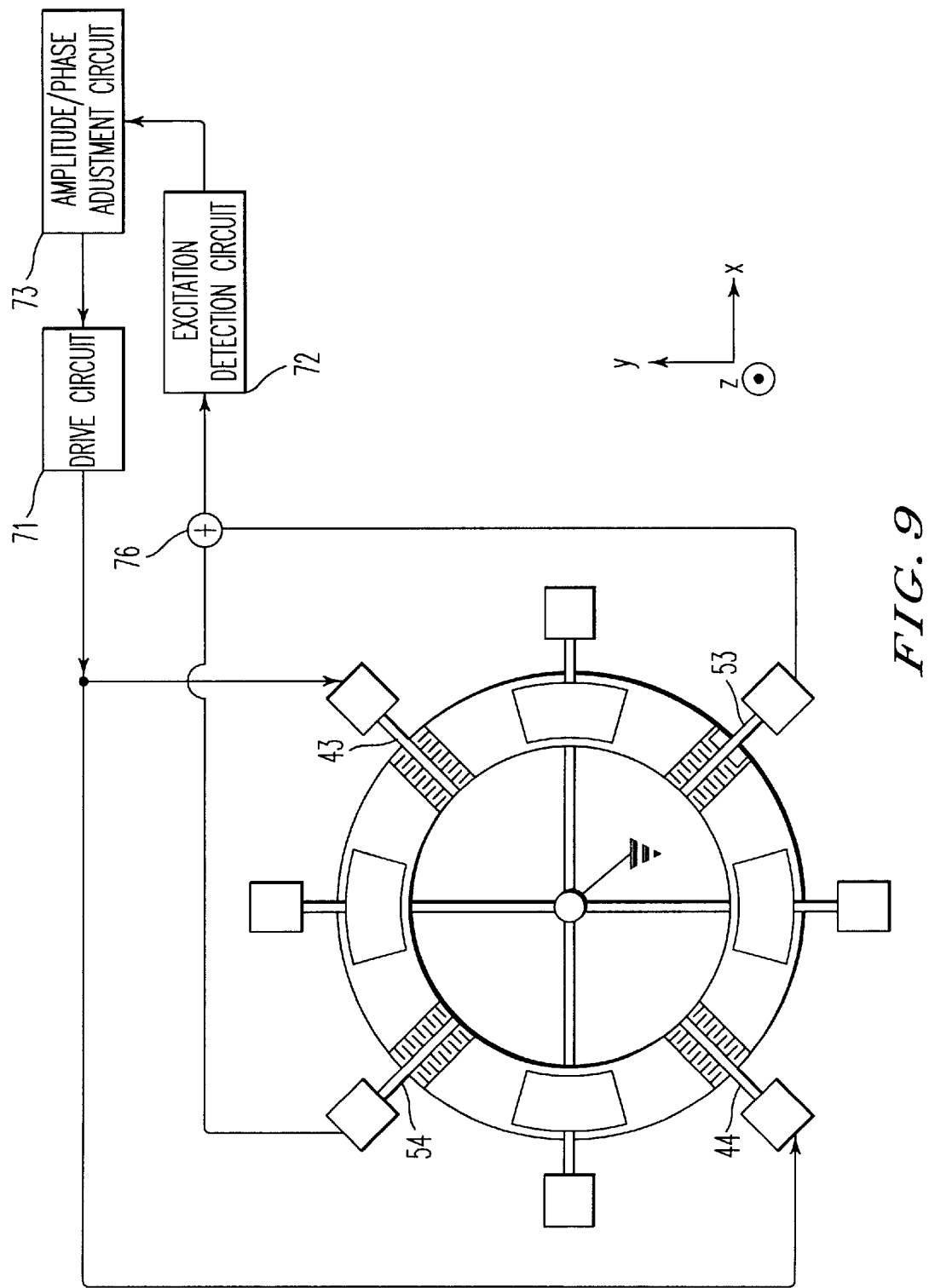
FIG. 9 is a block diagram showing the configuration of a circuit for exciting mass portions of the angular velocity detector according to the second embodiment.

The mechanism for exciting the angular velocity detector 200 is the same as that used in the first embodiment shown in FIGS. 5A and 5B. In the second embodiment, a common excitation electrode 43 is used in place of the adjacent excitation electrodes 41a and 42a shown in FIG. 5A, and a common excitation electrode 44 is used in place of the adjacent excitation electrodes 41b and 42b shown in FIG. 5A. Similarly, in the second embodiment, a common excitation detection electrode 53 is used in place of the adjacent excitation detection electrodes 51a and 52b shown in FIG. 5A, and a common excitation detection electrode 54 is used in place of the adjacent excitation detection electrodes 52a and 51b shown in FIG. 5A. Therefore, without provision of the adders 74 and 75, the mass portions can be excited by a circuit having a configuration shown in FIG. 9 and adapted to distribute an excitation signal to the excitation electrodes 43 and 44.

Figure 10A:
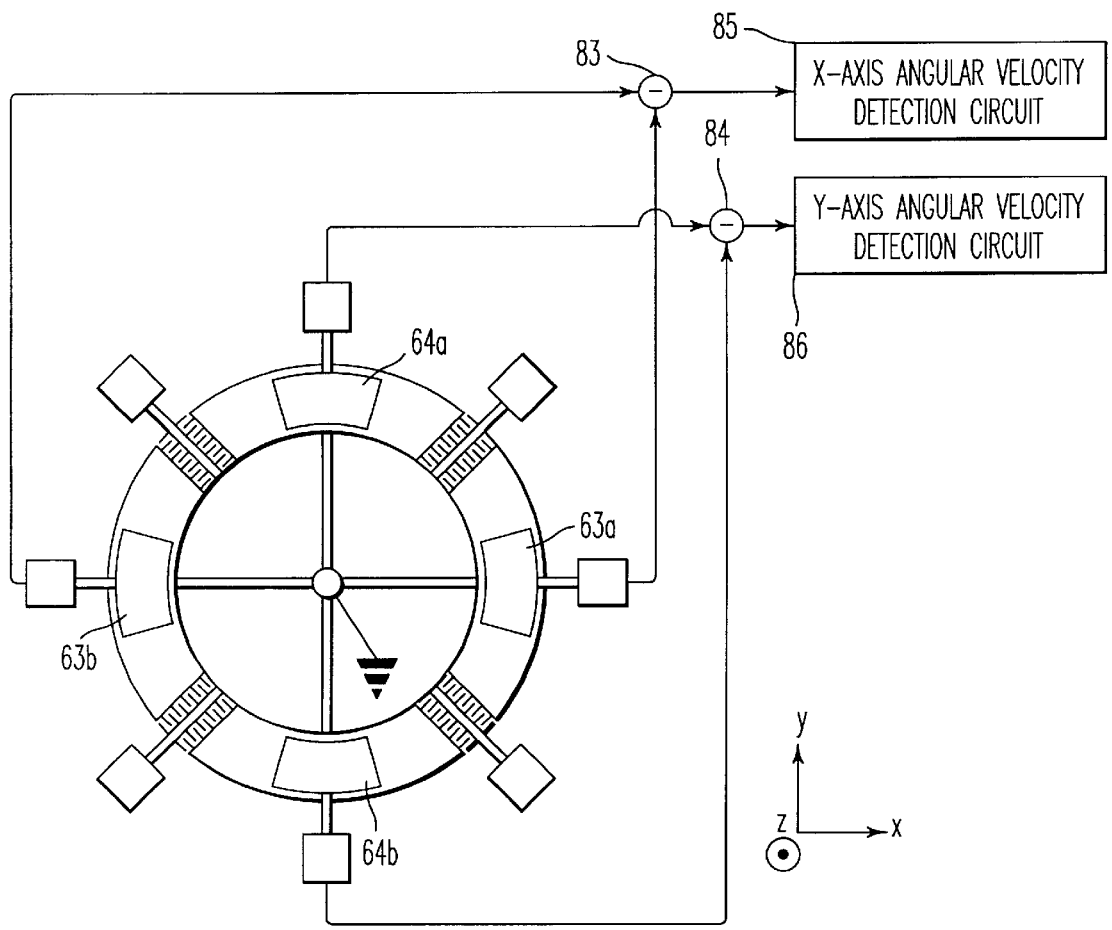
FIGS. 10A and 10B are block diagrams showing the configuration of a circuit for detecting angular velocities about the X and Y axes through use of the angular velocity detector according to the second embodiment.
Figure 10B:
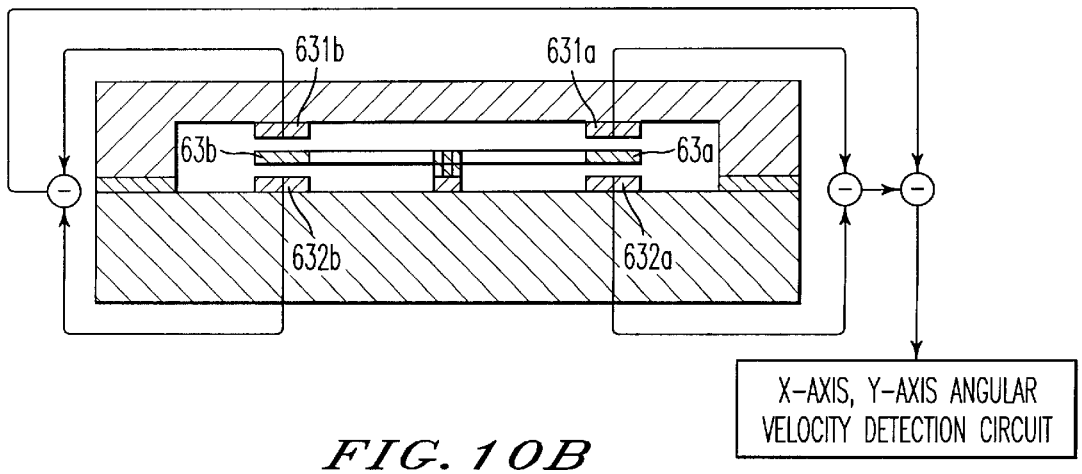

The ordinary excitation mode and the excitation mode along the Z-axis direction when angular velocities are applied about the X and Y axes are the same as those in the first embodiment. Also, the angular velocities about the X and Y axes can be measured through use of a circuit shown in FIGS. 10A and 10B, which is substantially identical to the circuit shown in FIGS. 6A and 6B.

Figure 11A:
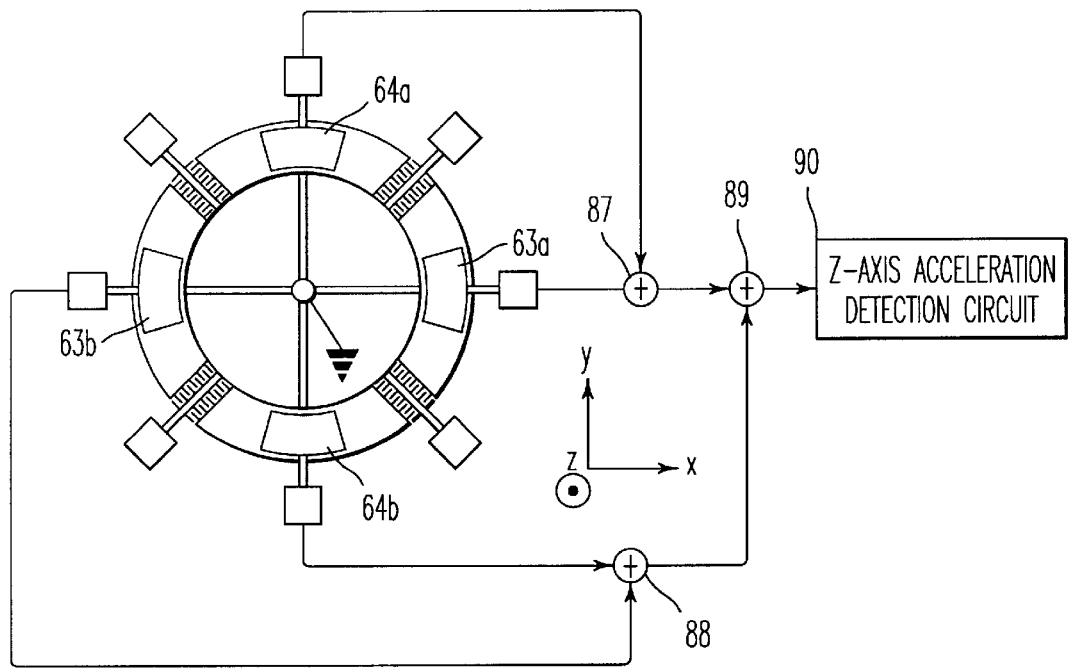
FIGS. 11A and 11B are block diagrams showing the configuration of a circuit for detecting angular acceleration about the Z axis through use of the angular velocity detector according to the second embodiment.
Figure 11B:
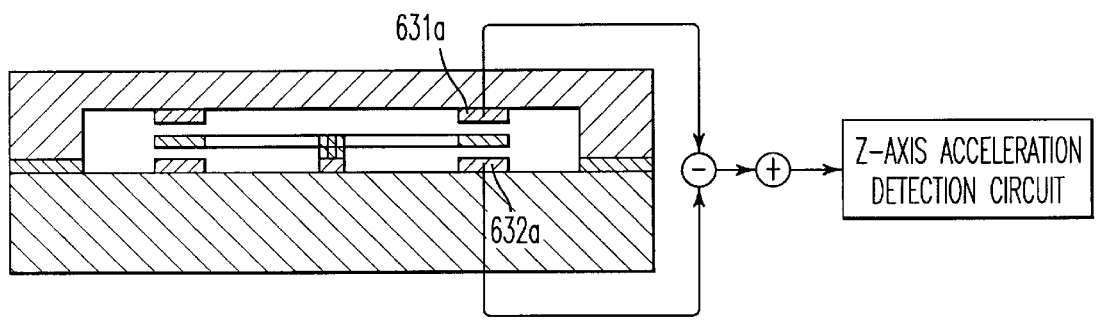

In the detector 200 according to the second embodiment, the two common excitation detection electrodes are used in place of the four independent excitation detection electrodes. Therefore, the detector 200 cannot sense a displacement in the X-axis direction and a displacement in the Y-axis direction in a separated manner, and cannot separate an angular displacement about the Z-axis from a vibration displacement. Therefore, acceleration can be sensed in only the Z-axis direction. Since the positional relationships among the sensing electrodes 63a, 63b, 64a, and 64b is the same as in the first embodiment, acceleration in the Z-axis direction can be sensed by use of a circuit shown in FIGS. 11A and 11B, which is similar to the circuit shown in FIGS. 7A and 7B.

In the second embodiment, since the excitation electrodes and the excitation detection electrodes are configured for common use, the structure can be simplified in order to facilitate fabrication of the detector, although the number of kinds of detectable physical quantities decreases. Further, the resonance frequency and the resonance Q value can be adjusted through adjustment of the width of the ring formed by the mass portions. In addition, since comb-shaped electrodes are used for the excitation electrodes and the excitation detection electrodes, a high degree of coupling is established, resulting in an increase in the efficiency of excitation and detection. Moreover, since the comb-shaped electrodes are formed in a space between adjacent mass portions, high excitation accuracy can be maintained even when the mass portions move greatly in the Z-axis direction. Therefore, stable excitation is enabled, and thus the sensing accuracy can be improved. Modifications similar to those of the first embodiment may be implemented in the present embodiment. In such a case as well, the effects of the present embodiment can be obtained.

Figure 12:
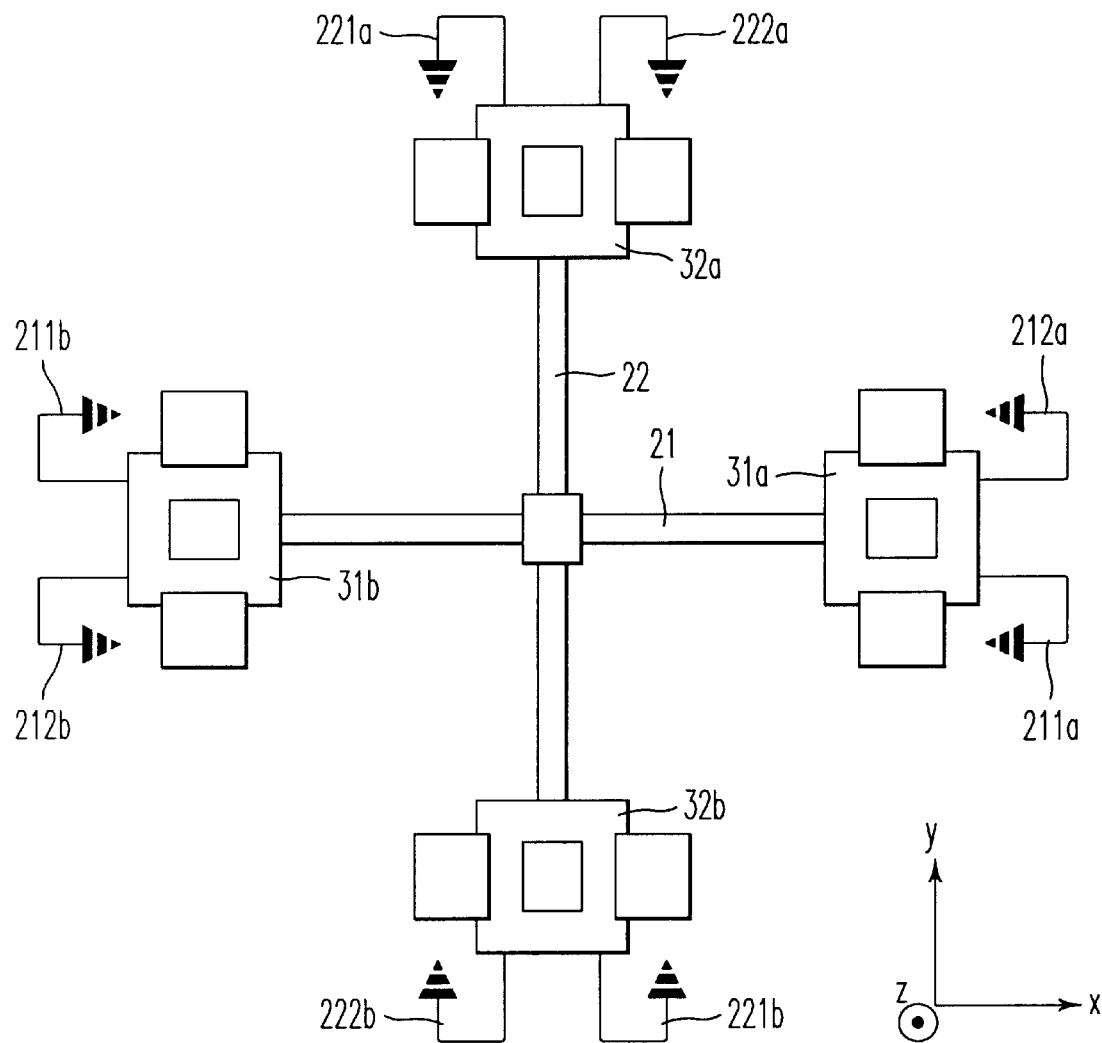
FIGS. 12–14 are structural views showing other mechanisms for supporting the mass portions.
Figure 13:
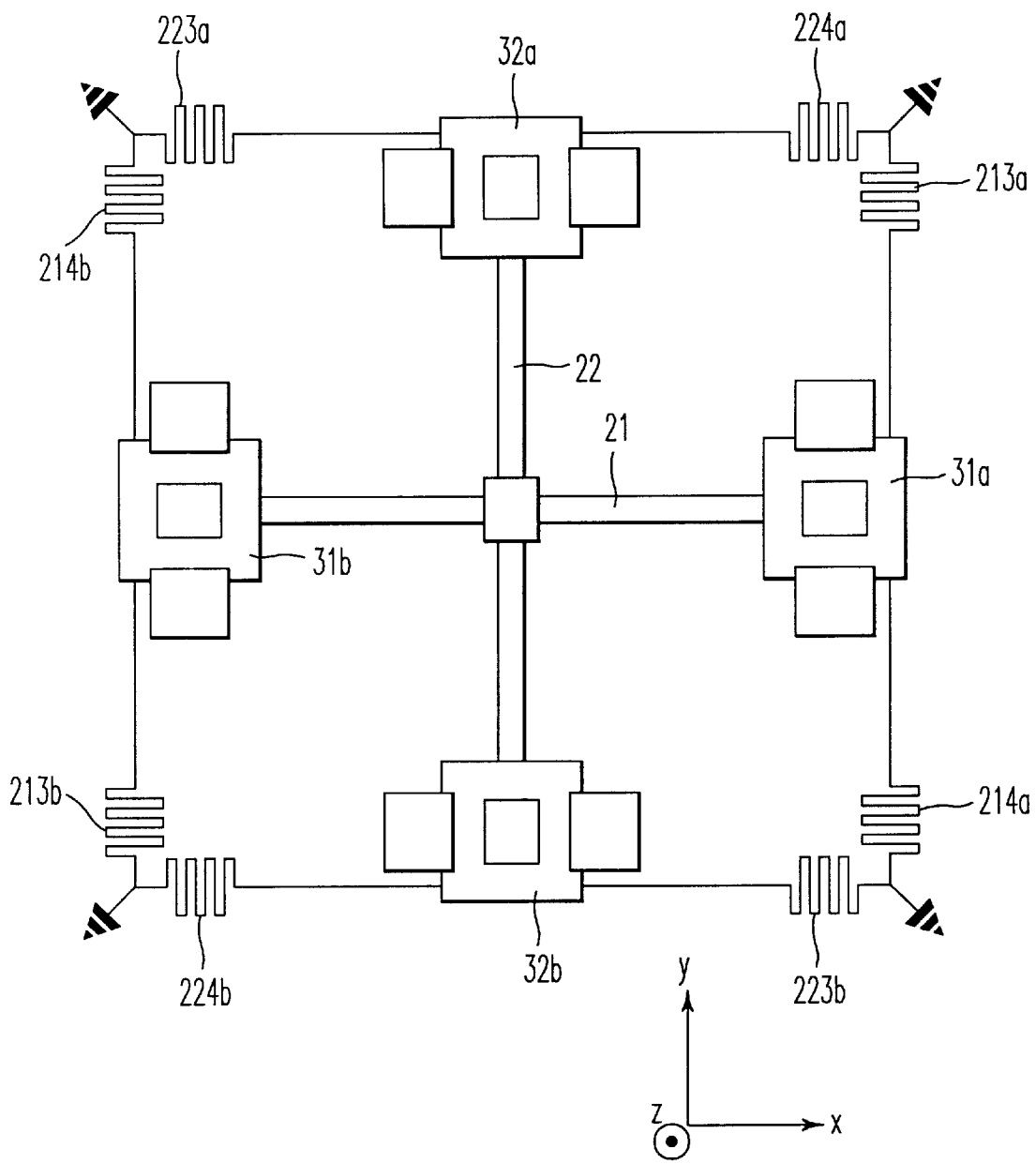
Figure 14:
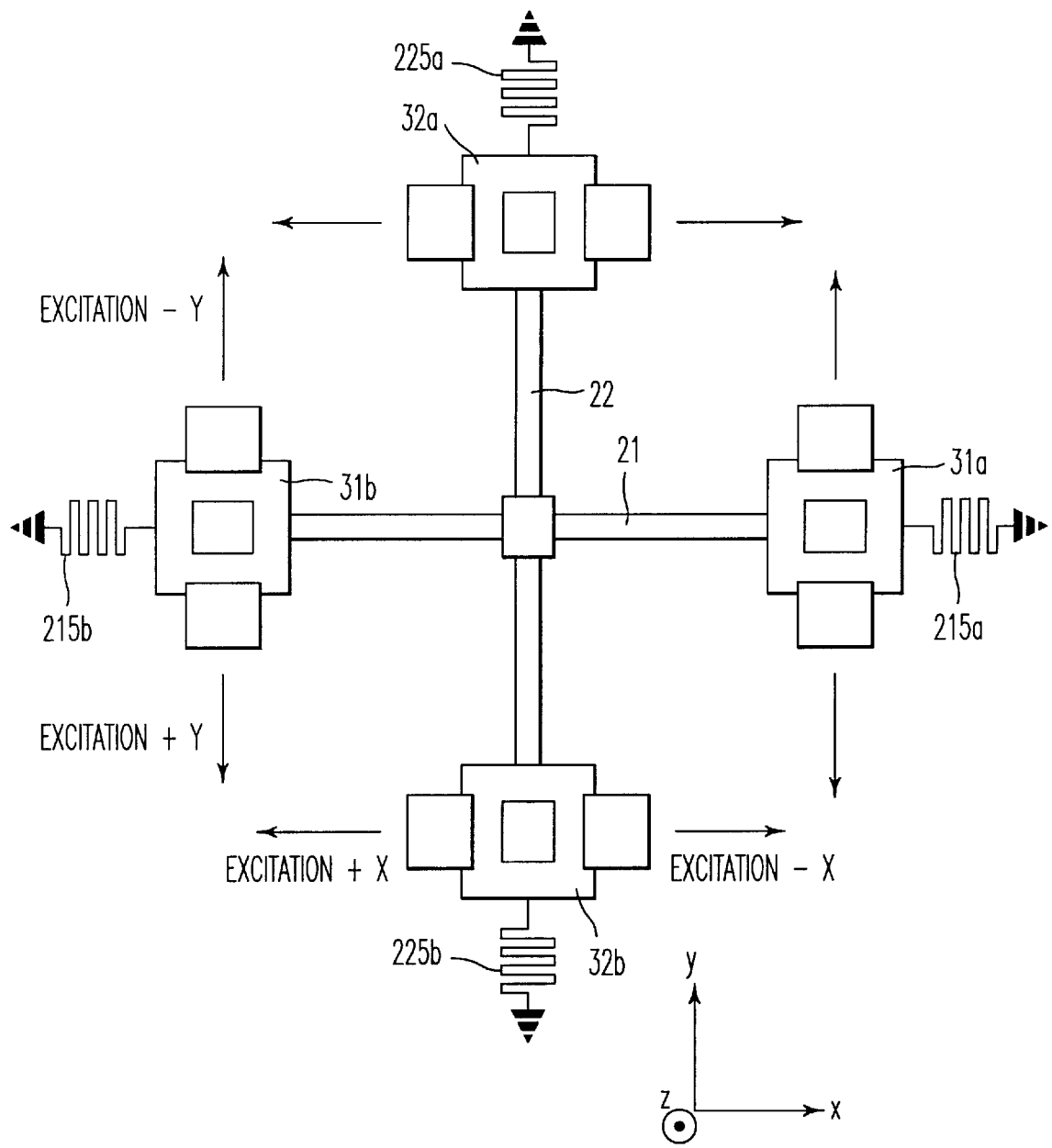

In the above-described first and second embodiments, the mass portions are held by the first and second excitation beams 21 and 22, each of which is a cantilever beam. However, the mass portions to be freely vibrated may be supported by beams having both ends supported as shown in FIGS. 12, 13, and 14. That is, in FIG. 12, the mass portion 31a is supported by a pair of folded beams 211a and 212a whose base end portions are fixed to the substrate 10, and the mass portion 31b is supported by a pair of folded beams 211b and 212b whose base end portions are fixed to the substrate 10, so that the mass portions 31a and 31b easily move in the Y-axis direction. Similarly, the mass portion 32a is supported by a pair of folded beams 221a and 222a and the mass portion 32b is supported by a pair of folded beams 221b and 222b, so that the mass portions 32a and 32b easily move in the X-axis direction.

In FIG. 13, in place of the folded beams, springs are used to support the mass portions. That is, the mass portion 31a is supported by a pair of springs 213a and 214a whose base end portions are fixed to the substrate 10 and which are extendable in the Y-axis direction, and the mass portion 31b is supported by a pair of springs 213b and 214b whose base end portions are fixed to the substrate 10 and which are extendable in the Y-axis direction, so that the mass portions 31a and 31b easily move in the Y-axis direction. Similarly, the mass portion 32a is supported by a pair of springs 223a and 224a which are extendable in the X-axis direction and the mass portion 32b is supported by a pair of springs 223b and 224b which are extendable in the X-axis direction, so that the mass portions 32a and 32b easily move in the X-axis direction.

In FIG. 14, in place of the paired springs shown in FIG. 13, a single spring is used to support each mass portion. That is, the mass portion 31a is supported by a spring 215a whose base end portion is fixed to the substrate 10 and which is extendable in the X-axis direction, and the mass portion 31b is supported by a spring 215b whose base end portion is fixed to the substrate 10 and which is extendable in the X-axis direction, so that the mass portions 31a and 31b easily move in the Y-axis direction. Similarly, the mass portion 32a is supported by a spring 225a which is extendable in the Y-axis direction and the mass portion 32b is supported by a spring 225b which is extendable in the Y-axis direction, so that the mass portions 32a and 32b easily move in the X-axis direction.

The above-described structure enables each mass portion to be vibrated in a desired direction. Also, since each mass portion is supported by a beam whose both ends are supported, the structure becomes robust. In addition, the mass portions are prevented from coming into contact with the substrate. Further, since each mass portion is supported at a plurality of points, possibility of breakage during fabrication can be decreased, so that fabrication of the detector becomes easier. Especially, in the structure shown in FIG. 13, adjacent mass portions; for example, 31a and 32a, are supported by springs 213a and 224a which are connected together. Therefore, the four mass portions move in a more-strongly interlocked manner, so that the vibration mode can be stabilized with improved symmetry. Further, in the structure shown in FIG. 12, since the mass portion 31a is supported by the folded beams 211a and 212a and the like, a spring having a small spring constant can be realized, and the vibration mode of the mass portion is hardly affected by the internal stress of the spring.

Moreover, angular velocity about the Z-axis can be detected through integral calculation of angular acceleration about the Z-axis. The above-described detection circuit may be configured through use of an analog or digital hardware circuit or by use of a computer system that uses software.

In the above-described embodiments, the respective mass portions are vibrated by electrostatic force; however, the mass portions may be vibrated by Lorentz force. Further, although vibrations are detected through detection of changes in electric capacitance, vibrations may be detected through utilization of electromotive force caused by electromagnetic induction. An arbitrary physical quantity may be used for detection of vibrations insofar as the physical quantity allows detection of a displacement in the form of an electric quantity.

What is claimed is:

1. A detector for detecting at least one physical quantity from among linear acceleration, angular acceleration, and angular velocity, fabricated through micro-machining, comprising:

a substrate;

a plurality of excitation beams extending along two different directions parallel to the surface of said substrate;

a fixing portion for fixing said excitation beams to said substrate at an intersecting portion of said excitation beams;

a plurality of mass portions each having an inertial mass and supported at free ends of said excitation beams to be excited with respect to said substrate;

a plurality of excitation electrodes for exciting said mass portions by providing electrical force, each excitation electrode being disposed to face said corresponding mass portion at one end of said mass portion; and a driving means for applying AC voltage to said excitation electrodes;

and wherein said mass portions are excited such that two adjacent mass portions vibrate parallel to said substrate and in opposite phases in a rotational direction about a vertical axis to said surface of said substrate, and said excitation beams have flexibility in both planes which are parallel and perpendicular to the surface of said substrate.

2. A detector according to claim 1, further comprising a plurality of sensing electrodes each disposed to face said corresponding mass portion.

3. A detector according to claim 2, wherein when X and Y axes are defined on said surface of said substrate and a Z axis is defined to be perpendicular to said surface of said substrate, said excitation beams form a cruciform shape extending along X-axis and Y-axis directions.

4. A detector according to claim 3, further comprising an X-axis angular velocity detection circuit or a Y-axis angular velocity detection circuit for detecting a physical amount related to Colioli's force as vibration in Z-axis direction, said physical amount being generated at said mass portions in a direction perpendicular to the surface of said substrate due to angular velocity about X-axis and Y-axis.

5. A detector according to claim 3, further comprising a Z-axis acceleration detection circuit for detecting acceleration in said Z-axis direction through measurement of an amount by which all said mass portions are offset in the same phase in said Z-axis direction.

6. A detector according to claim 2, wherein each sensing electrode comprises a pair of electrodes disposed parallel to said surface of said substrate such that said pair of electrodes sandwich opposite faces of said corresponding mass portion.

7. A detector according to claim 1, wherein when X and Y axes are defined on said surface of said substrate and a Z axis is defined to be perpendicular to said surface of said substrate, said excitation beams form a cruciform shape extending along X-axis and Y-axis directions.

8. A detector according to claim 7, further comprising an X-axis acceleration detection circuit for detecting acceleration in said X-axis direction through measurement of an offset amount of vibration that acts in opposite phases on a pair of said mass portions that are supported on said excitation beam extending along said Y-axis direction and are excited in a common phase.

9. A detector according to claim 7, further comprising a Y-axis acceleration detection circuit for detecting acceleration in said Y-axis direction through measurement of an offset amount of vibration that acts in opposite phases on a pair of said mass portions that are supported on said excitation beam extending along said X-axis direction and are excited in a common phase.

10. A detector according to claim 7, further comprising a Z-axis angular acceleration detection circuit for detecting angular acceleration in said Z-axis rotational direction through measurement of an amount by which all the mass portions are offset in the same phase in said Z-axis rotational direction.

11. A detector according to claim 1, wherein each mass portion which is supported at one side by the corresponding excitation beam is also supported at an opposite side by another beam.

12. A detector according to claim 1, wherein each of said excitation electrode comprises a pair of electrodes disposed parallel to the surface of said substrate at an end of said corresponding mass portion in a rotational direction about said Z-axis such that said pair of electrodes sandwich opposite surfaces of said corresponding mass portion.

13. A detector according to claim 1, further comprising a plurality of excitation detection electrodes for detecting vibration of said mass portions, each excitation detection electrode being disposed to face said corresponding mass portion at an opposite end of said mass portion.

14. A detector according to claim 13, wherein each of said excitation detection electrode comprises a pair of electrodes disposed parallel to the surface of said substrate at an end of said corresponding mass portion in a rotational direction about said Z-axis such that said pair of electrodes sandwich opposite surfaces of said corresponding mass portion.

15. A detector according to claim 1, wherein said driving means applies AC voltages to one pair of said excitation electrodes which are disposed between one adjacent pair of said mass portions and to the other pair of said excitation electrodes which are disposed between the other adjacent pair of said mass portions in the same phase as each other.

16. A detector according to claim 1, wherein said driving means applies AC voltage to said excitation electrodes which exist in the right side of the odd-numbered mass portions and to said excitation electrodes which exist in the left side of the even-numbered mass portions in the same phase as each other, when said mass portions are sequentially numbered clockwise around said fixing portion.

17. A detector for detecting at least one physical quantity from among angular velocity and linear acceleration, fabricated through micro-machining and comprising:

a substrate;

a plurality of excitation beams extending along two different directions parallel to the surface of said substrate;

a fixing portion for fixing said excitation beams to said substrate at an intersecting portion of said excitation beams;

four mass portions each having an inertial mass, having an arcuate shape to together forming a ring-like shape, and being supported at free ends of said excitation beams to be excited with respect to said substrate;

a plurality of excitation electrodes for exciting said mass portions in a rotational direction about a vertical axis to said substrate by providing electrical force, each excitation electrode being commonly disposed between two adjacent mass portions, two excitation electrodes being disposed at radially opposite positions with respect to said vertical axis;

a plurality of excitation detection electrodes for detecting amplitude of vibration of said mass portions in said rotational direction, each excitation detection electrode being commonly disposed between two adjacent mass portions, two excitation detection electrodes being disposed at radially opposite positions with respect to said vertical axis and between said two excitation electrodes;

a plurality of sensing electrodes for detecting a physical quantity in relation to a Coriolis force generated in a direction parallel to said vertical axis at each mass portion, or in relation to an acceleration force, each sensing electrode being disposed to face said mass portions; and a driving means for applying AC voltage to said excitation electrodes; and wherein said mass portions are excited such that two adjacent mass portions vibrate parallel to said substrate and in opposite phases in said rotational direction about said vertical axis, and said excitation beams have flexibility in both planes which are parallel and perpendicular to the surface of the substrate.

18. A detector according to claim 17, wherein when X and Y axes are defined on said surface of said substrate and a Z axis is defined to be perpendicular to said surface of said substrate, said excitation beams form a cruciform shape extending along X-axis and Y-axis directions.

19. A detector according to claim 18, further comprising an X-axis angular velocity detection circuit or a Y-axis angular velocity detection circuit for detecting a physical amount related to Colioli's force as vibration in Z-axis direction, said physical amount being generated at said mass portions in a direction perpendicular to the surface of said substrate due to angular velocity about X-axis and Y-axis.

20. A detector according to claim 18, further comprising a Z-axis acceleration detection circuit for detecting acceleration in said Z-axis direction through measurement of an amount by which all said mass portions are offset in the same phase in said Z-axis direction.

21. A detector according to claim 17, wherein each mass portion which is supported at one side by the corresponding excitation beam is also supported at an opposite side by another beam.

22. A detector according to claim 17, wherein each sensing electrode comprises a pair of electrodes disposed parallel to said surface of said substrate such that said pair of electrodes sandwich opposite faces of said corresponding mass portion.

* * * * *